US012601365B2

(12) United States Patent
Reynolds

(10) Patent No.: US 12,601,365 B2
(45) Date of Patent: Apr. 14, 2026

(54) HANGERS AND HANGER SYSTEMS

(71) Applicant: GRIPPLE LIMITED, Sheffield (GB)

(72) Inventor: Thomas Reynolds, Sheffield (GB)

(73) Assignee: GRIPPLE LIMITED (GB)

( * ) Notice: Subject to any disclaimer, the term of this patent is extended or adjusted under 35 U.S.C. 154(b) by 306 days.

(21) Appl. No.: 18/271,600

(22) PCT Filed: Feb. 9, 2022

(86) PCT No.: PCT/IB2022/051150
§ 371 (c)(1),
(2) Date: Jul. 10, 2023

(87) PCT Pub. No.: WO2022/175786
PCT Pub. Date: Aug. 25, 2022

(65) Prior Publication Data
US 2024/0093710 A1 Mar. 21, 2024

(30) Foreign Application Priority Data

| | | |
|---|---|---|
| Feb. 17, 2021 | (GB) | ..................................... 2102215 |
| Jun. 29, 2021 | (GB) | ..................................... 2109333 |
| Feb. 8, 2022 | (GB) | ..................................... 2201577 |

(51) Int. Cl.
*F16B 19/00* (2006.01)
*F16B 2/04* (2006.01)
*H02G 3/00* (2006.01)

(52) U.S. Cl.
CPC .............. *F16B 19/004* (2013.01); *F16B 2/04* (2013.01); *H02G 3/263* (2013.01)

(58) Field of Classification Search
CPC ............ H02G 3/00; H02G 3/26; H02G 3/263; H02G 3/30; H02G 3/320456; H02G 7/05;
(Continued)

(56) References Cited

U.S. PATENT DOCUMENTS

| | | | |
|---|---|---|---|
| 3,565,375 A | | 2/1971 | Babb |
| 4,660,750 A | * | 4/1987 | Blanchard ............ A47G 25/485 211/124 |

(Continued)

FOREIGN PATENT DOCUMENTS

| | | |
|---|---|---|
| CN | 201302012 | 9/2009 |
| CN | 210380033 U | 4/2020 |

(Continued)

OTHER PUBLICATIONS

Patents Act 1977: Examination Report under Section 18(3) reported Sep. 17, 2024 for GB2201577.0.
(Continued)

*Primary Examiner* — Jonathan P Masinick
(74) *Attorney, Agent, or Firm* — Clark Hil PLC; James R. Foley

(57) ABSTRACT

A hanger (10) comprises a main part (12) having a holding formation (36) for holding an elongate article (15) in a position in which the elongate article (15) extends through the holding formation (36). The main part (12) has a support portion (38) for supporting an elongate item (11). The main part (12) defines a gap (22) to allow the elongate item (11) to be received in the support portion (38). The hanger (10) further includes a closure member (24) to close the gap (22).

18 Claims, 23 Drawing Sheets

(58) Field of Classification Search

CPC .. H02G 7/06; H02G 7/08; B60M 1/20; B60M 1/22; B60M 1/225; B60M 1/23; F16B 2/20; F16B 2/22; F16B 2/04; F16B 2/0433; F16L 3/14

See application file for complete search history.

(56) References Cited

U.S. PATENT DOCUMENTS

| | | | |
|---|---|---|---|
| 7,407,138 | B1 | 8/2008 | Gretz |
| 8,220,757 | B2 * | 7/2012 | Gardner ..................... F16L 3/22 |
| | | | 248/74.1 |
| D723,362 | S * | 3/2015 | Bacon ............................ D8/396 |
| 9,377,134 | B2 * | 6/2016 | Bacon ....................... F16L 3/13 |
| 9,671,046 | B2 * | 6/2017 | Whipple ................. F16L 3/233 |
| 9,800,028 | B1 * | 10/2017 | Smith ................. H02G 3/0443 |
| 10,663,088 | B2 * | 5/2020 | Vaccaro .............. H02G 3/0456 |
| 10,920,910 | B1 | 2/2021 | Gretz |
| 11,236,858 | B1 * | 2/2022 | Rigby ................... H02G 3/263 |
| 11,913,575 | B2 * | 2/2024 | Joshi ........................ H02G 3/32 |
| 11,967,815 | B2 * | 4/2024 | Worden ................. H02G 3/263 |
| 12,092,246 | B2 * | 9/2024 | Worden .................... F16L 3/02 |
| D1,069,561 | S * | 4/2025 | Martinage ..................... D8/367 |
| D1,069,563 | S * | 4/2025 | Martinage ..................... D8/367 |
| 12,288,971 | B2 * | 4/2025 | Jette ......................... H02G 3/32 |
| 2016/0153587 | A1 * | 6/2016 | Smith ...................... H02G 3/30 |
| | | | 29/515 |
| 2016/0281881 | A1 | 9/2016 | Vaccaro et al. |
| 2017/0219128 | A1 | 8/2017 | Anderson et al. |
| 2017/0353024 | A1 | 12/2017 | Varale et al. |
| 2018/0347727 | A1 * | 12/2018 | Shea ................... H02G 3/0456 |
| 2020/0069098 | A1 * | 3/2020 | Heimowitz-Richter .................... |
| | | | A47G 25/48 |
| 2023/0194022 | A1 * | 6/2023 | Varale ...................... F16L 3/13 |
| | | | 248/69 |
| 2023/0291192 | A1 * | 9/2023 | Sunderland ............ F16L 3/243 |
| 2024/0093710 | A1 * | 3/2024 | Reynolds ................. F16B 2/04 |
| 2025/0031886 | A1 * | 1/2025 | Tabujara ................... F16B 2/22 |
| 2025/0062603 | A1 * | 2/2025 | Barnes ..................... F16L 3/02 |
| 2025/0233395 | A1 * | 7/2025 | Worden ................ H02G 3/263 |

FOREIGN PATENT DOCUMENTS

| | | | | | |
|---|---|---|---|---|---|
| DE | 9200764 | U1 * | 6/1992 | | |
| JP | H09-126361 | A | 5/1997 | | |
| JP | H11-230417 | A | 8/1999 | | |
| JP | 2007-309510 | A | 11/2007 | | |
| KR | 20080085351 | A * | 9/2008 | ............... | F16L 3/04 |
| KR | 101144188 | B1 * | 5/2012 | ............... | H02G 7/20 |
| KR | 101151697 | B1 * | 5/2012 | ............... | H02G 1/02 |
| KR | 101241104 | B1 * | 6/2012 | ............... | H02G 7/06 |
| KR | 101381584 | B1 * | 4/2014 | ............... | H02G 1/02 |
| KR | 101421942 | B1 * | 8/2014 | ............... | H02G 7/20 |
| KR | 20140101909 | | 8/2014 | | |
| KR | 101488372 | B1 * | 2/2015 | ............... | H02G 1/04 |
| KR | 101492041 | | 2/2015 | | |
| KR | 200488728 | | 3/2019 | | |
| KR | 102007182 | B1 | 7/2019 | | |
| WO | 2018/111513 | A1 | 6/2018 | | |
| WO | 2018/226874 | A1 | 12/2018 | | |

OTHER PUBLICATIONS

Communication pursuant to Article 94(3) EPC for EP 22706393.0 mailed Nov. 18, 2025.

* cited by examiner

HANGERS AND HANGER SYSTEMS

This invention relates to hangers suitable for supporting items, which may be elongate items, for example cables or the like. This invention may also relate to hanger systems comprising such hangers.

The installation of electrical cables can require cables to be suspended. However, in some circumstances, for example on solar farms, or in other situations, such as on the electricity supply system of an electric railway, it may be difficult finding suitable articles from which the cables can be suspended.

According to one aspect of this invention, there is provided a hanger comprising a main part having a holding formation for holding an elongate article extending therethrough and mounting the hanger to the elongate article, and the main part having a support portion for supporting an item.

According to another aspect of this invention, there is provided a hanger comprising: a main part having a holding formation for holding an elongate article extending therethrough; and an insertion member securable to the main part; wherein the main part has a support portion for supporting an item.

The insertion member may be received by the main part.

According to a further aspect of the invention, there is provided a hanger comprising main part having a holding formation for holding an elongate article extending therethrough, and the main part having a support portion for supporting an item, wherein the holding formation comprises a detent member for mounting the elongate article to the holding formation.

According to a further aspect of this invention, there is provided a hanger comprising: a main part having a holding formation for holding an elongate article extending therethrough; and a reinforcing member for reinforcing the main part; wherein the main part has a support portion for supporting an item.

According to another aspect of this invention, there is provided a hanger comprising a main part having a holding formation for holding an elongate article extending therethrough, and the main part having a support portion for supporting an item, wherein the main part defines a gap to allow the item to be received in the support portion, and the hanger further including a closure member to close the gap.

The holding formation may be a holder configured to hold the elongate article. The support portion may be a support configured to support the item. The closure member may be a closure configured to close the gap. The reinforcing member may be a reinforcement configured to reinforce the main part.

According to another aspect of this invention, there is provided a hanger comprising a main part having a holder configured to hold an elongate article in a position in which the elongate article extends through the holding formation, and the main part having a support configured to support an elongate item, wherein the main part defines a gap to allow the item to be received in the support, and the hanger further including a closure to close the gap.

The reinforcing member may be received by the main part.

The holding formation may mount the hanger on the elongate article. The elongate article may be an elongate support article.

The item may be an elongate item. The elongate item may be a cable, such as an electric cable or a data cable. The embodiments of the invention described herein may be suitable for use in solar farms, but may be used in electric railways, mining or industrial situations.

The embodiments of the invention described herein may be suitable for use with an elongate article in the form of a catenary wire, or a messenger wire of a catenary system.

In a first embodiment, the insertion member comprises a mounting member to mount the hanger on the elongate article. The mounting member may be engageable with the elongate article. The mounting member may be receivable in the holding formation to mount the hanger on the elongate article. In the first embodiment, the holding formation may hold the mounting member.

The mounting member may mount the main part of the hanger on the elongate article.

The holding formation may define a recess having an open end for receiving the elongate article into the recess. The holding formation may comprise a detent member for securing the elongate article in the holding formation. The detent member may be provided within the recess. The detent member may be a detent configured to secure the elongate article in the holder.

The detent member may allow the holding formation to effect a press fit over the elongate article to secure the hanger to the elongate article.

In the second embodiment, the main part may be formed of a polymeric material, such as an industrial plastics material.

The recess may have a locking end defining a locking space in which the elongate article may be locked. The detent member may lock the elongate article in the locking space.

The detent member may comprise a resiliently deformable gripping member for gripping the elongate article. The gripping member may be a gripper configured to grip the elongate article. The detent member may comprise a resilient portion and a locking portion on the resilient portion. The locking portion may be for locking the elongate article in the holding formation. The locking portion may comprise a shoulder for engaging the elongate article to lock the elongate article to the holding formation.

The resilient portion may be deformable by the elongate article. The holding formation may define a receiving space into which the resilient portion is deformed when the elongate article is received in the holding formation.

In the second embodiment, the reinforcing member may comprise an insertion member. The reinforcing member may be received by the main part. The receipt of the reinforcing member by the main part may secure the reinforcing member to the main part.

The reinforcing member may define a corresponding holding space. The holding space may be aligned with the holding formation when the reinforcing member is received by the main part.

The holding space may include a corresponding receiving space. The corresponding receiving space may be aligned with said receiving space when the reinforcing member is secure to the main part.

In the embodiments described herein, holding formation provides the advantage that the hanger can be dropped onto the elongate article and clipped in place. In addition, the detent member helps to prevent the hanger slipping along the elongate article, thereby ensuring the hanger remains in place and does not move. The detent member also acts as a bonding interface between the elongate article and hanger.

In the second embodiment, the reinforcing member provides the advantage that it supports the loads and prevents creep in the environments in which the hanger is installed.

It is desirable that the polymeric material from which the main part may be formed can withstand the aforesaid environment. Said polymeric material may further provide electric insulation against broken electrical cables.

The main part may define a gap to allow the item to be received in the support portion. The closure member may comprise a gate member.

The reinforcing member may have a support portion.

The main part may have an upper edge region. The reinforcing member may have an upper edge region.

The hanger may comprise upper walls forming said upper edge region of the main part. The upper walls may have opposite free ends defining the gap therebetween. The gap may be defined in the upper edge region of the main part. The closure member may extend between the upper walls across the gap.

The main part may have a lower edge region. The reinforcing member may have a lower edge region.

The hanger may have lower walls forming the lower edge region. The hanger may have a pair of the lower walls, which may be opposite each other.

The main part of the hanger may define an access formation. The access formation may extend from the holding formation of said hanger to an edge of the main part.

The edge of said main part may define an opening for the access formation. The opening may be defined in an edge region of the main part. The opening may be defined in said lower edge region. The opening may be defined between the lower walls.

The edge region may be a lower edge region. The access formation may extend from the opening to the holding formation.

The access formation may allow access for the elongate article to the holding formation.

The access formation may be a passage. The holding formation may be wider than the access formation.

The lower walls may define the opening therebetween.

A pair of central walls may extend from the lower walls. The central walls may extend from the lower walls at the opening.

The central walls may extend from the lower walls to the upper walls. The hanger may comprise two of the support portions. The support portions may be arranged on opposite sides of the central walls.

The opening may be defined between the central walls.

The access formation may be defined between the central walls. The elongate article may pass along the access formation in order to be received by the mounting member.

The main part may have a pair of opposite side walls, which may extend between the upper and lower walls. The side walls may provide side edge regions of the main part. The central walls may be substantially parallel to the side walls.

Alternatively, the access formation may be the gap. The holding formation may have an entrance formation for the elongate article. The entrance formation may provide communication between the support portion and the holding formation.

The hanger may include a fastening arrangement to fasten the closure member to the main part. The fastening arrangement may comprise fasteners configured to fasten the closure to the main part. The fastening arrangement may comprise first and second cooperating fastening formations. The first fastening formation may be a first fastener. The first fastening formation may be provided on the main part. The second fastening formation may be a second fastener. The second fastening formation may be provided on the closure member.

The fastening arrangement may comprise a hook formation and a receiving formation. The hook formation may be received by the receiving formation to fasten the closure member to the main part. The receiving formation may be a hole.

Two of the first fastening formations may be provided on the main part. A respective one of the two first fastening formations may be provided at opposite ends of the gap.

In the first embodiment, the first fastening formation may be the hook formation. In the first embodiment, each first fastening formation may be provided on a respective one of the upper walls. The second fastening formation may comprise the receiving formation.

The closure member may have opposite ends, and may include two of the second fastening formations. Each of the second fastening formations may be provided at a respective opposite end of the closure member.

A respective one of the first fastening formations may be received by each of the second fastening formations, thereby fastening the closure member to the main part.

In the first embodiment, the main part may be resilient. The resilience of the main part may urge the first fastening formations into tight engagement with the closure member when the first fastening formations are received by the second fastening formations.

The holding formation may be defined above the centre of gravity of the main part.

The hanger may comprise a frame, said frame providing the edge of the main part.

The mounting member may be arrangeable around the elongate article. The mounting member may have fastening elements for fastening the elongate article. The mounting member may define a fastening space. The fastening space may be defined adjacent the fastening elements. The fastening elements may comprise fasteners configured to fasten the elongate article.

The elongate article may be held in the fastening space by the fastening elements. The mounting member may have a pair of opposite arms. Each arm may comprise a clamping arm. The fastening elements may be provided on the arms. The elongate article may be clamped by the arms in the fastening space.

The mounting member may be substantially U shaped. The mounting member may receive the elongate article between the arms.

The mounting member and the main part of said hanger may have cooperating attaching formations to attach the mounting member in the holding formation. The attaching formations may comprise snap fit formations. The attaching formations may further include inwardly extending projections to cooperate with the snap fit formations.

Each of the arms may have two opposite side edges, and each snap fit formation may be provided on a respective one of the side edges. The inwardly extending projections may have opposite ends to engage the snap fit formations.

The mounting member may comprise two pairs of the attaching formations. Each arm may have two opposite side edges. Each snap fit formation may be provided on a respective one of the side edges. The attaching formations may include two of the inwardly extending projections to cooperate with the snap fit formations. The inwardly extending projections may be arranged opposite each other. Each of the inwardly extending projections may be arranged on a respective one of the arms.

The inwardly extending projections may have opposite ends to engage the snap fit formations.

The mounting member and the holding formation may also include locating portions for locating the mounting member in the holding formation. The locating portions may comprise the inwardly extending projections of the holding formation. The locating portions may comprise upper and lower outwardly extending projections of the mounting member. The inwardly extending projections may define upper and lower indented regions to receive the upper and lower outwardly extending projections of the mounting member.

The upper and lower indented regions of the inwardly extending projections of the holding formation may cooperate with the outwardly extending projections of the mounting member to locate the mounting member in the holding formation.

The mounting member and the holding formation may have locating portions for locating the mounting member in the holding formation. The locating portions may comprise inwardly extending projections on the holding formation. The locating portions may further include upper and lower outwardly extending projections on the mounting member. The inwardly extending projections on the holding formation may cooperate with the outwardly extending projections on the mounting member to locate the mounting member in the holding formation.

The main part may have a support portion. The main part may have two adjacent support portions. In the second embodiment, the reinforcing member may have a support portion. The reinforcing member may have two adjacent support portions.

The, or each, support portion may define a supporting space in which the items can be received. Where the hanger comprises two of the support portions, the support portions may be arranged on opposite sides of the central walls.

In the second embodiment, each of the walls may comprise first and second wall members. The first wall member may be an inner wall member. The second wall member may be an outer wall member. The, or each, support portion may comprise the first wall members.

The first wall members may surround the, or each, supporting space. The first wall members may comprise upper and lower first wall members. The first wall members may further include side first wall members extending between the upper and lower first wall members.

The first wall members further include central first wall members.

The central first wall members may extend from the lower first wall members.

Each support portion may receive one or more of the items. Each support portion may be defined between a respective one of the central walls and the side wall adjacent thereto.

The, or each, item may be an elongate item, such as a cable, for example, an electric cable. The, or each, elongate item may alternatively be, for example, a strand, wire, wire rope or the like.

In the second embodiment, the reinforcing member and the main part may constitute a major component. The reinforcing member may reinforce the main part. The reinforcing member may be substantially planar. The main part may have a substantially flat portion for engaging the reinforcing member.

The main part may have a receiving region for receiving the reinforcing member. The receiving region may be defined by the walls. The receiving region may comprise said substantially flat portion of the main part. The receiving region may be defined between said first and second wall members. The substantially flat portion may have a face of the receiving region. The receiving region may be a cavity defined by the main part.

The hanger may include a connecting arrangement for connecting the hanger to a further hanger. The connecting arrangement may be provided at the upper and lower edge regions of the main part and the reinforcing member. The connecting arrangement may be a connector configured to connect the hanger to a further hanger.

The connecting arrangement may comprise a connecting aperture defined at one of the upper and lower edge regions of the hanger. Each of the main part and the reinforcing member may define a respective subsidiary aperture. The subsidiary apertures may be aligned with each other to form the connecting aperture.

The connecting arrangement may comprise a ridge configured to extend into the connecting aperture. The reinforcing member may comprise the ridge, which may extend into the subsidiary aperture defined by the reinforcing member.

The connecting arrangement may comprise a connecting projection at the other of the upper and lower edge regions of the reinforcing member. The connecting projection may be receivable in the connecting aperture of a further hanger to connect the hanger to the further hanger. The connecting projection may define a ridge receiving hole to receive the ridge of the further hanger.

The connecting aperture may be defined at the upper edge region of the hanger. The subsidiary aperture of each of the main part and the reinforcing member may be defined at the respective upper edge region of the main part and the reinforcing member. The connecting projection may be provided at the lower edge region of the reinforcing member.

Where the hanger comprises two of the support portions, the connecting arrangement may comprise a respective connecting aperture defined at the upper edge region adjacent each support portion.

Each of the main part and the reinforcing member may define two of the subsidiary apertures, the subsidiary apertures in the main part being aligned with the subsidiary apertures in the reinforcing member to form the two connecting apertures.

Where the hanger comprises two of the support portions, the connecting arrangement may comprise a respective one of the connecting projections at the lower edge region of the reinforcing member adjacent each support portion. Each connecting projection may be received in a respective one of the connecting apertures.

The connecting arrangement may comprise a respective ridge extending into each connecting aperture. Each ridge may be provided on the reinforcing member. Each ridge may be received in the ridge receiving hole of a respective one of the connecting projections.

The, or each, connecting projection may have a substantially L or J shaped end profile.

The reinforcing member may extend across the support portion, whereby the reinforcing member may support the item. The reinforcing member may extend around the support portion.

The fastening arrangement may fasten the closure member to the major component. The fastening arrangement may fasten the closure member to the main part.

The first fastening formation may comprise a protrusion. The second fastening formation may comprise a hole to receive the protrusion. The hole may be a slot having opposite ends. One of said ends may be open. The slot may include press fitting formations to fasten the closure member to the main part.

The protrusion may be received by the hole to fasten the closure member to the main part.

The fastening arrangement may comprise two of the first fastening formations and two of the second fastening formations. The, or each, protrusion may be received in the, or a respective, hole to fasten the closure member to the main part. The, or each, protrusion may be received into the, or a respective, hole via the open end of the, or each, holes.

The, or each, protrusion may be provided on the major component. The, or each, protrusion may be provided on the main part. The closure member may define the, or each, hole.

The closure member may be movable relative to the major component between open and closed positions. The closure member may be movable relative to the main part between the open and closed positions.

The closure member may be pivotally movable about the protrusion, or one of the protrusions, between the open and closed positions.

The first fastening formations may comprise upper and lower protrusions. The second fastening formations may comprise upper and lower slots. The lower protrusion may have a larger diameter than the upper protrusion.

According to another aspect of this invention, there is provided a hanger system comprising a hanger as described above, an elongate article on which the hanger is supported. The system may further include an elongate item supported by the hanger.

The elongate article may extend through the hanger. The elongate item may extend through the hanger.

The hanger system may comprise a plurality of the hangers supported at spaced locations along the elongate article. Each hanger may provide support to the elongate item.

Embodiments of the invention will now be described by way of example only, with reference to the accompanying drawings, in which.

Figure 1:
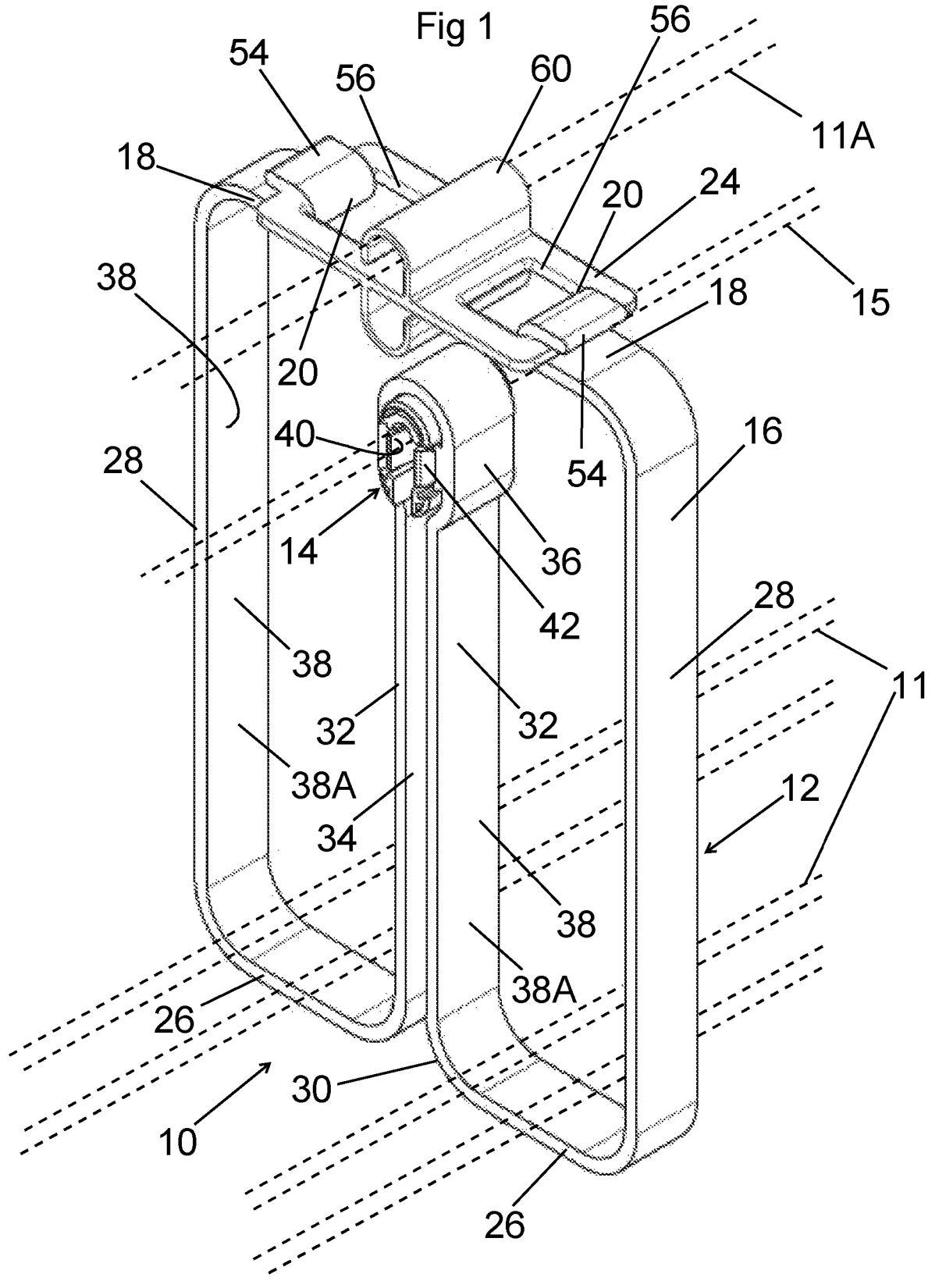
FIG. 1 is a perspective view of a first embodiment of a hanger.

FIG. 1 of the drawings shows a hanger 10 for use in supporting elongate items in the form of cables 11 (represented schematically by broken lines in FIG. 1), such as electric cables. It will be appreciated that the elongate items may be other forms of elongate items, such as wires, wire ropes, pipes or the like.

The hanger 10 comprises a body 11. The body 11 comprises a main part 12. The body 11 further includes an insertion member in the form of a mounting member 14 for mounting the hanger 10 on an elongate article 15, in the form of an elongate support article. The elongate article 15 is represented graphically by broken lines in FIG. 1.

The hanger 10 is particularly suitable for use in a hanger system, such as in the catenary system in a solar farm, or of an electrically powered railway. The elongate article 15 may be a messenger wire of the catenary system.

Figure 2:
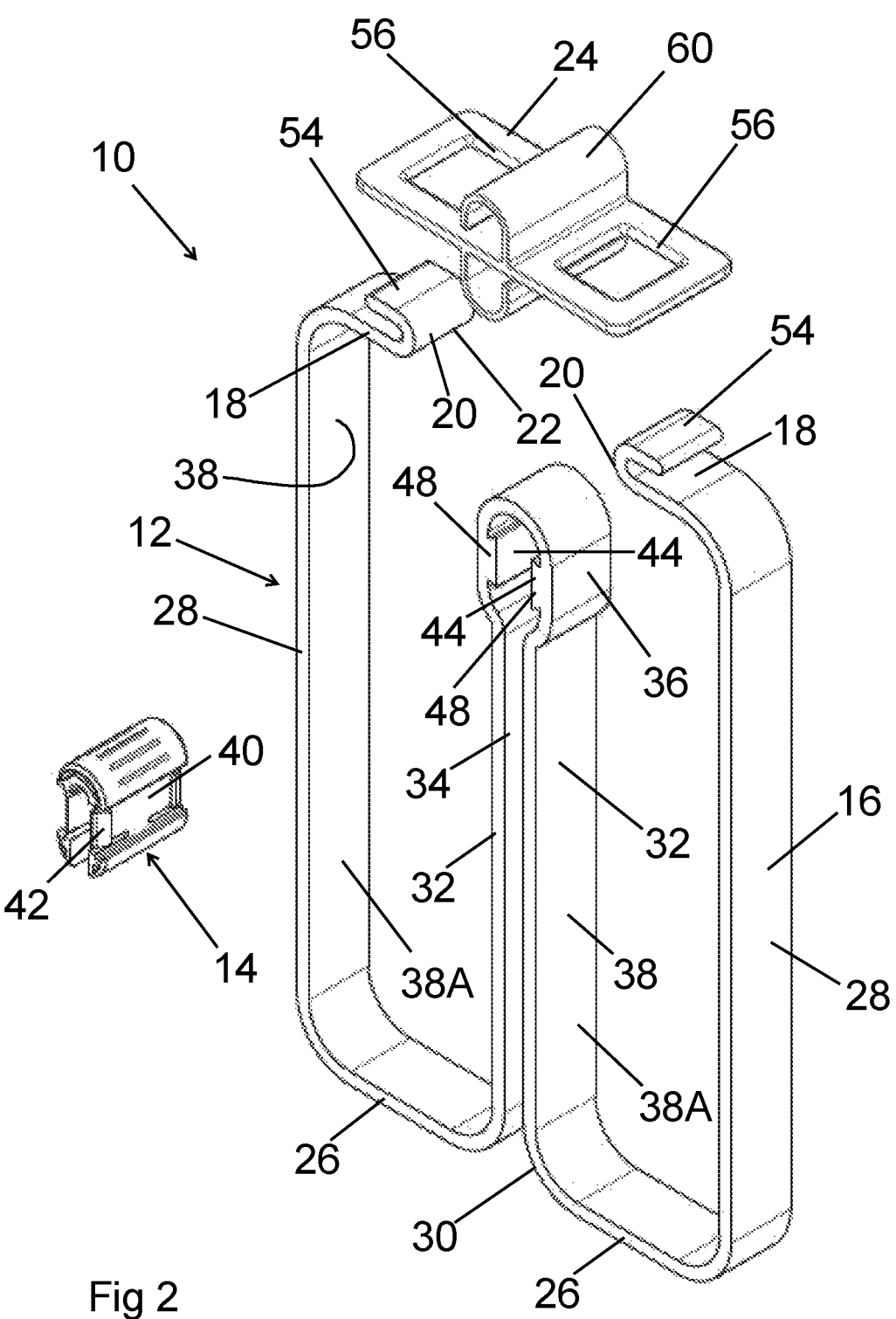
FIG. 2 is an exploded view of the first embodiment of the hanger.

The main part 12 is shown in FIG. 2, and is in the form of a frame. The main part 12 has a pair of opposed upper walls 18 forming an upper edge region of the main part 12.

The upper walls 18 have opposite free ends 20 defining therebetween a gap 22 (see FIG. 2) in the upper edge region of the main part 12. The hanger 10 further includes a closure member 24, in the form of a gate member, extending across the gap 22. The closure member 24 is affixed to the body 11 at the main part 12.

The main part 12 has a pair of opposed lower walls 26 forming a lower edge region. The main part 12 also has a pair of opposite side walls 28 extending between the upper and lower walls 18, 26, the side walls 28 providing side edge regions of the main part 12.

The lower walls 26 define therebetween an opening 30 in the lower edge region. A pair of central walls 32 extend upwardly from the lower walls 26 at the opening 30. The central walls 32 are substantially parallel to the side walls 28.

An access formation 34 is defined between the central walls 32. The access formation 34 is in the form of a passage along which the elongate article 15 can pass in order to be received by the mounting member 14, as explained below.

The main part 12 has a holding formation 36 in which the mounting member 14 is held. The holding formation 36 is provided at the upper end of the central walls 32, above the centre of gravity of the main part 12.

The access formation 34 extends from the opening 30 in the lower edge region to the holding formation 36. The holding formation 36 is wider than the access formation 34 and holds the mounting member 14.

In order for the elongate article 15 to be received in the mounting member 14, the elongate article 15 first passes through the opening 30 and is then moved along the access formation 34 to the mounting member 14 held by the holding formation 36.

The main part 12 has adjacent support portions 38 defining respective supporting spaces 38A arranged on opposite sides of the central walls 32. The support portions 38 receive the cables 11 so that the cables 11 are supported by the hanger 10. Each supporting space 38A is defined between a respective one of the central walls 32 and the side wall 28 adjacent thereto.

The main part 12 of the hanger 10 shown has two of the support portions 38. The central walls 32 extend between the support portions 38. The gap 22 provides communication to each support portion 38, and thus provides an entry region for cables 11 to be received in each support portion 38.

Figure 3:
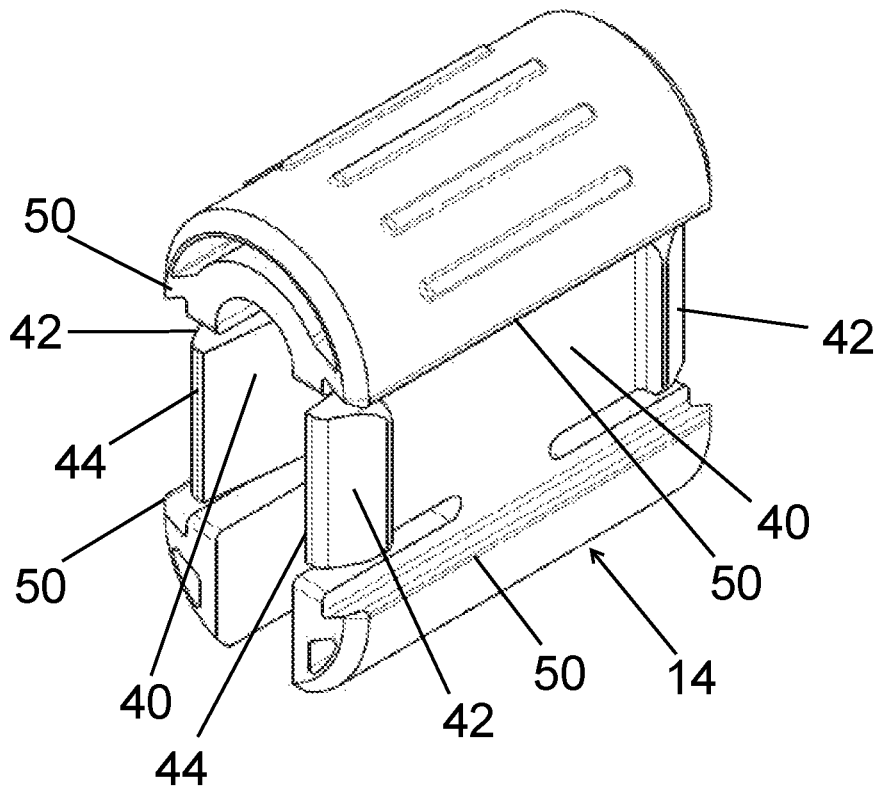
FIG. 3 is a close up view of a mounting member for use with the first embodiment of the hanger.
Figure 8:
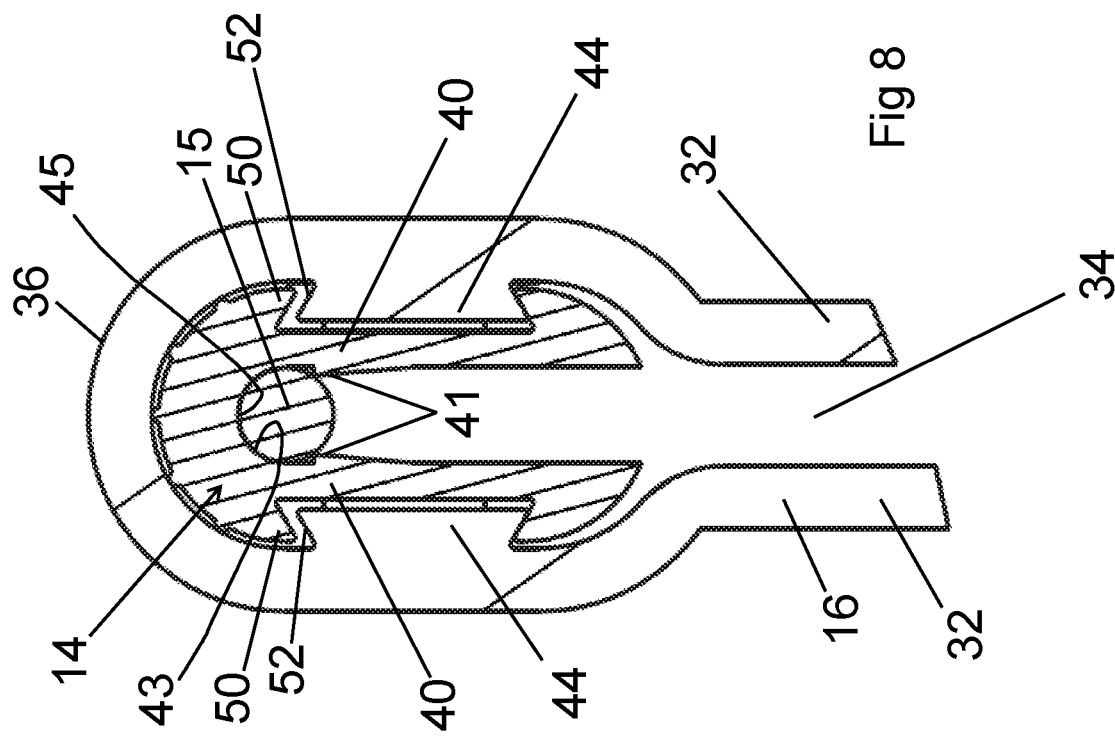
FIG. 8 is a sectional front view of the region marked VII in FIG. 6.
Figure 7:
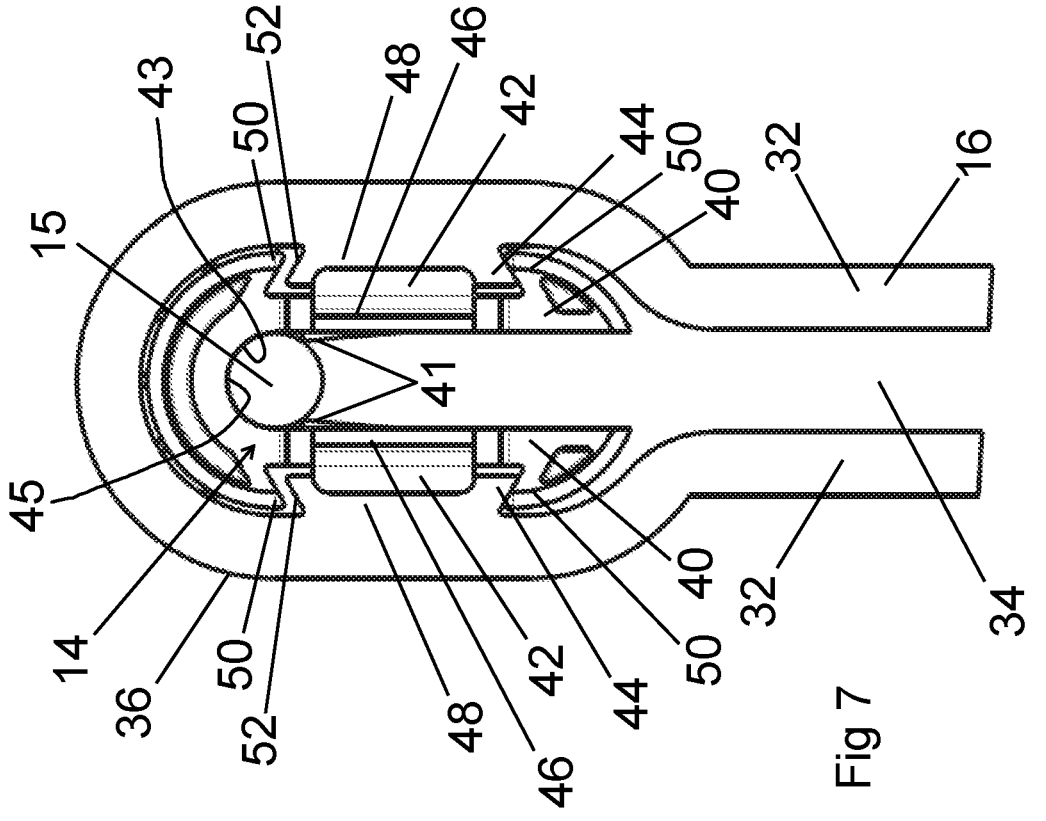
FIG. 7 is a close up view of the region marked VII in FIG. 6.
Figure 10:
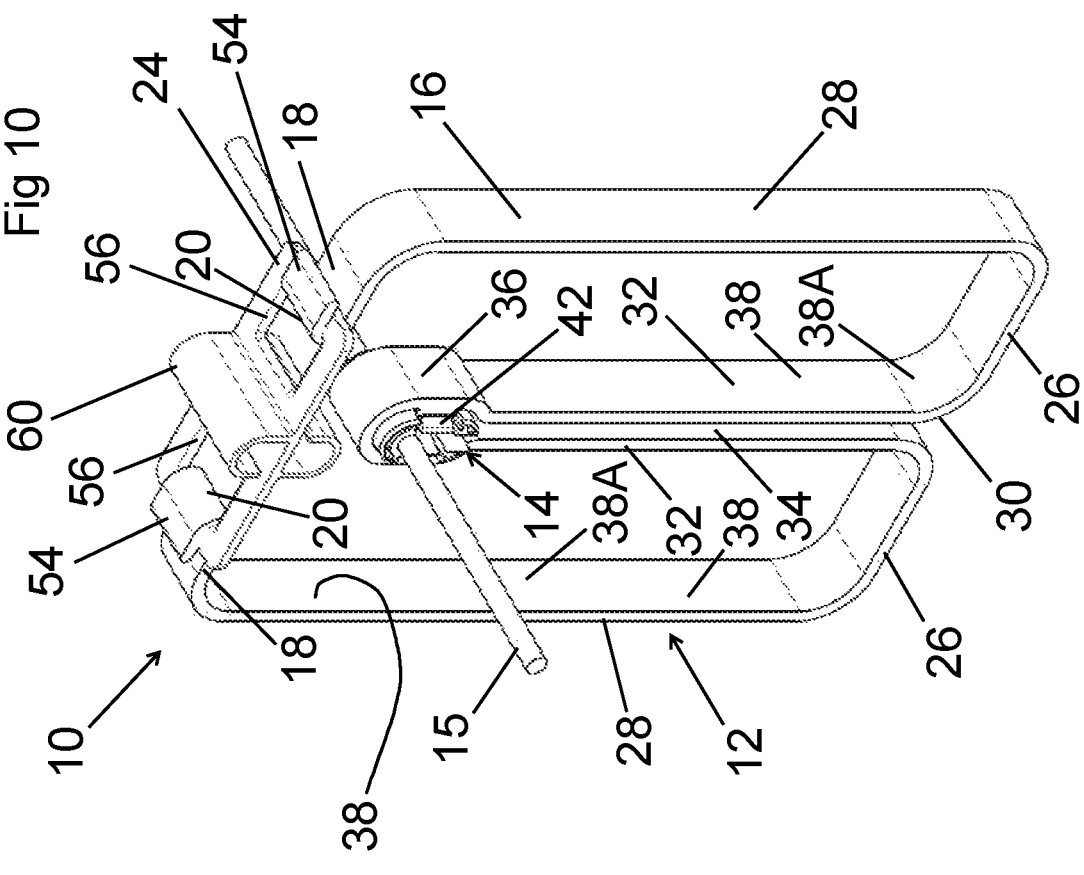
FIG. 10 shows the hanger mounted on the elongate article.
Figure 9:
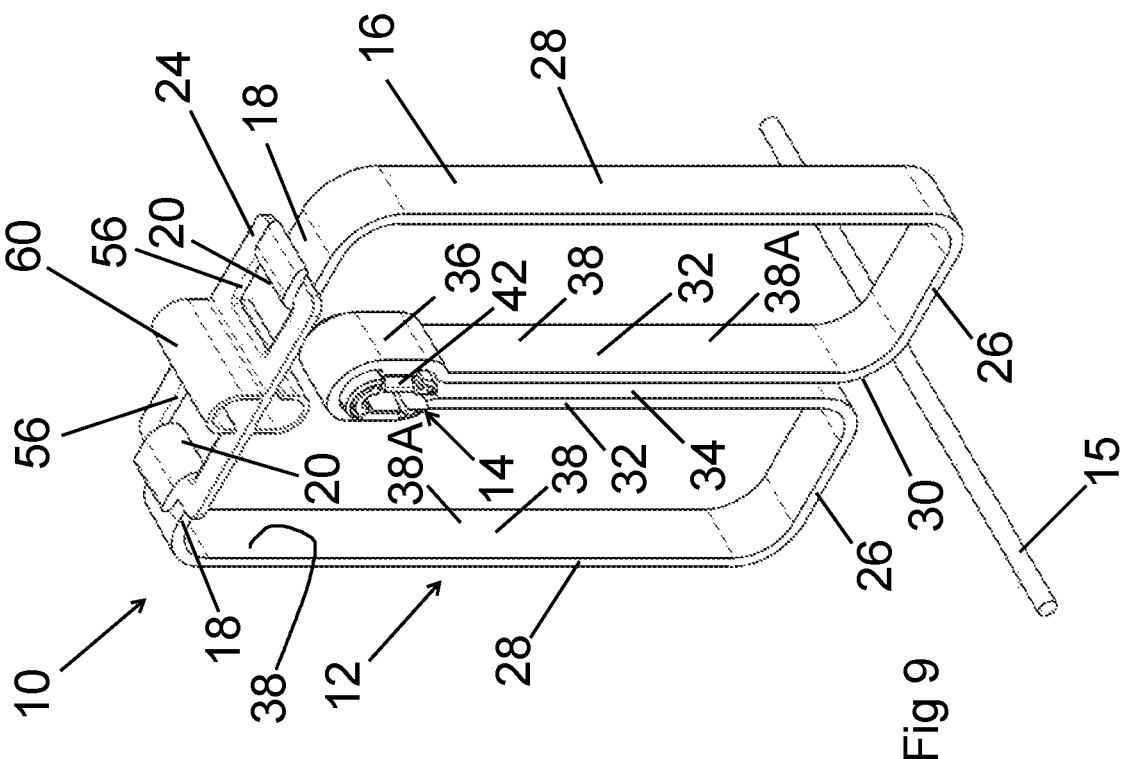
FIG. 9 shows the hanger being mounted on an elongate article.
Figure 11:
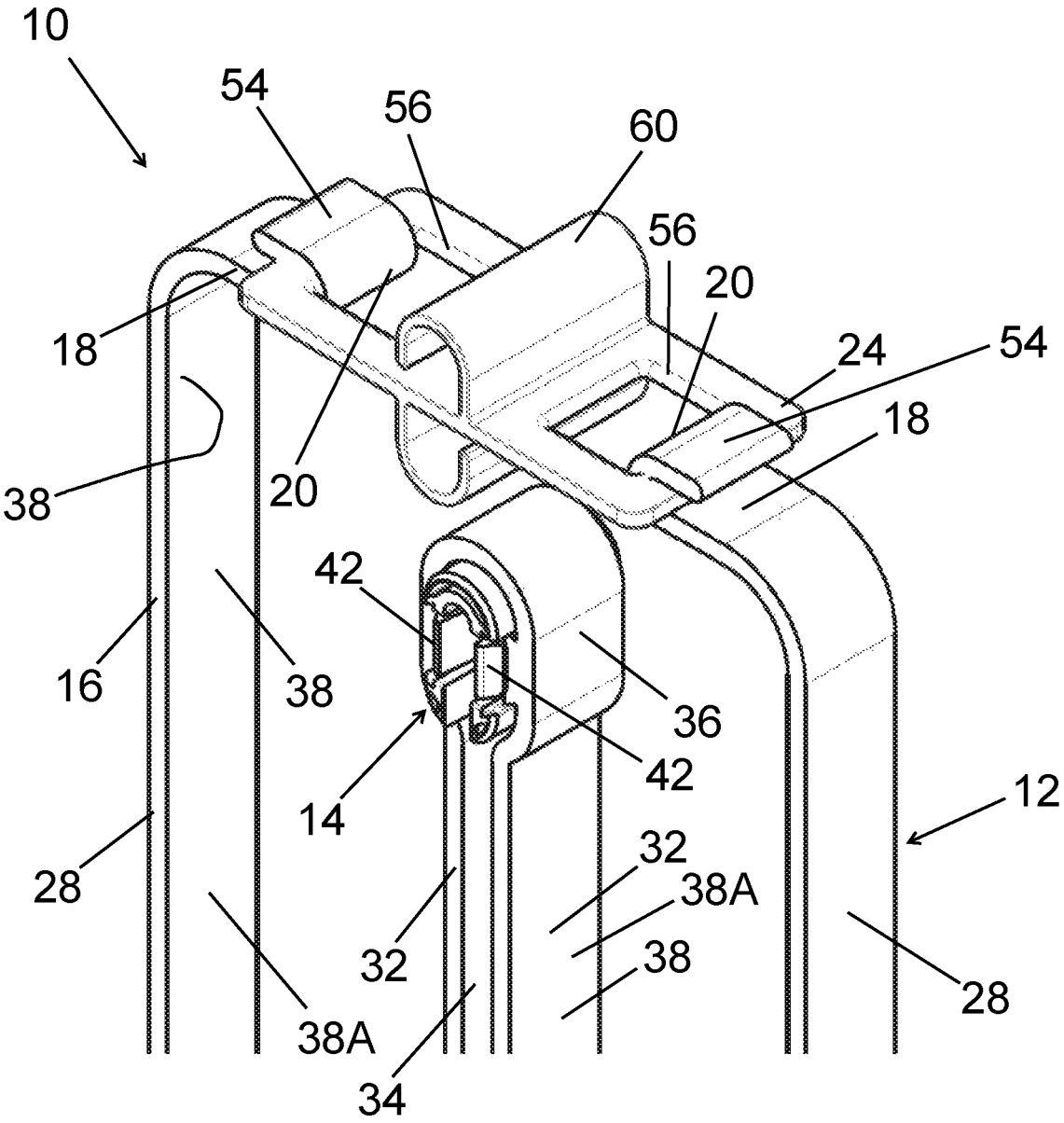
FIG. 11 is a close up view showing a closure member fastened to the main part.
Figure 12:
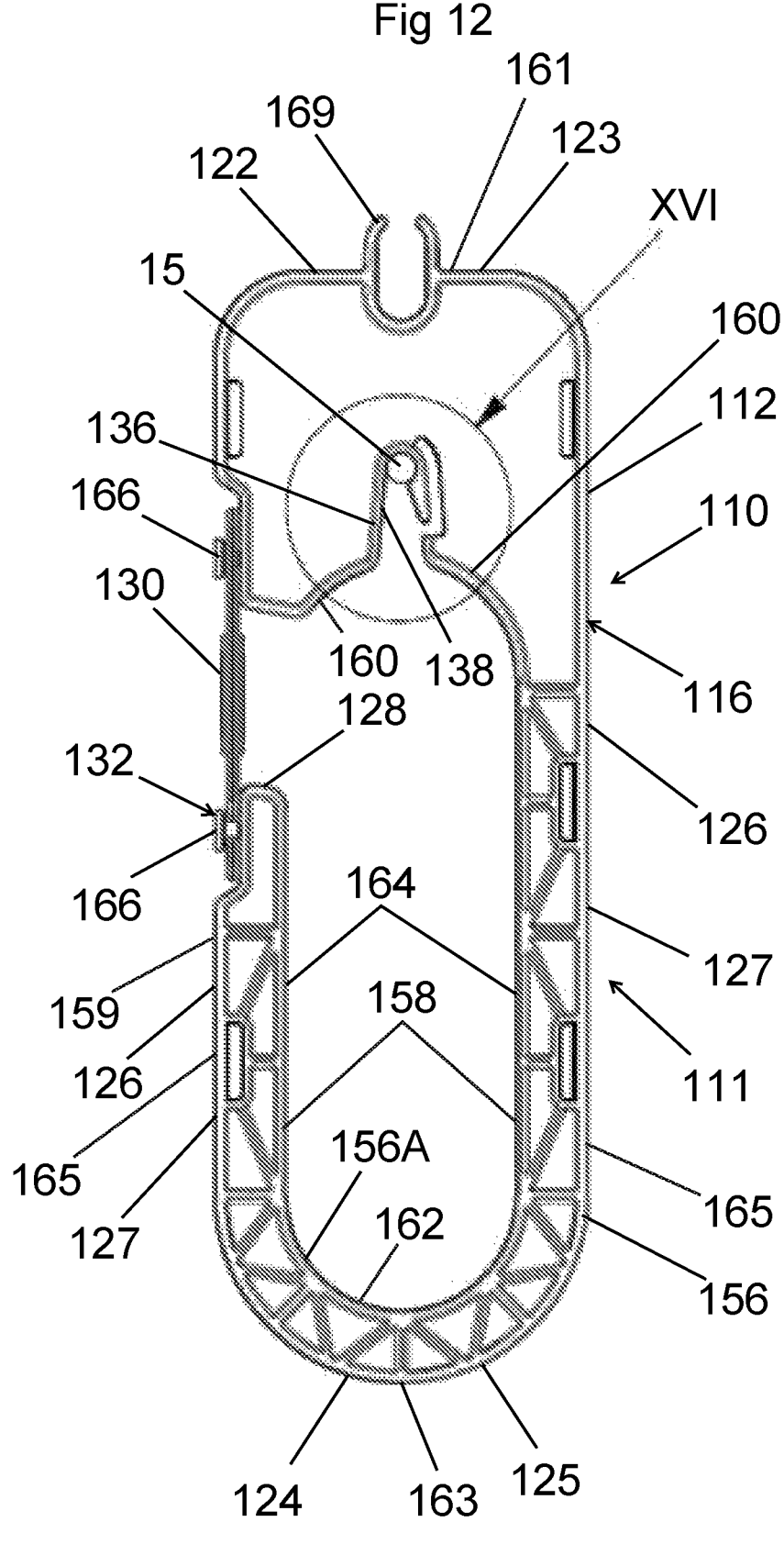
FIG. 12 is a front view of one version of a second embodiment of the hanger.
Figure 13:
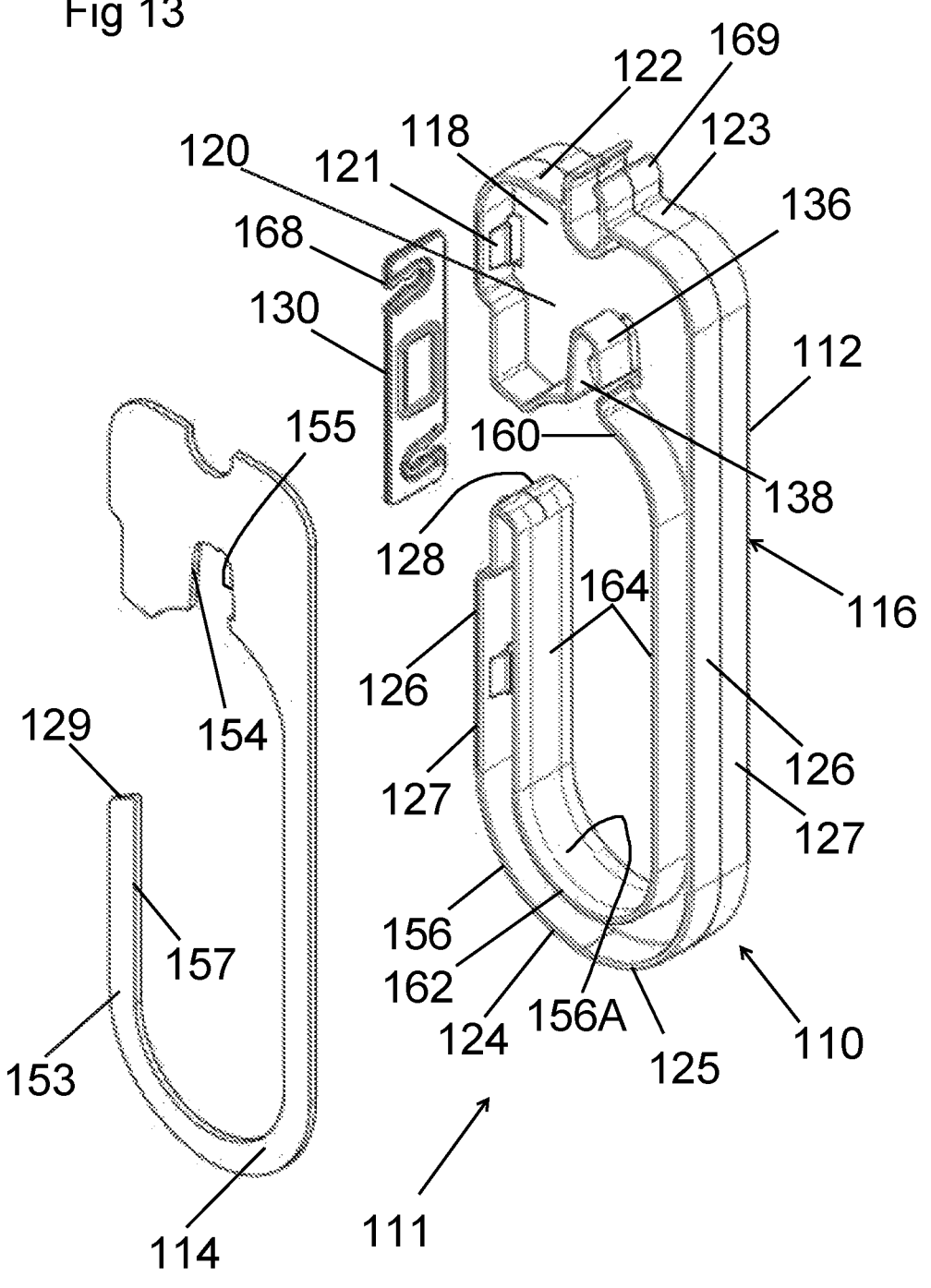
FIG. 13 is an exploded view of the hanger shown in FIG. 12.

The mounting member 14 is shown in FIG. 3, and comprises opposite clamping arms 40. The mounting member 14 further includes opposite fastening elements 41 (see FIG. 8) projecting towards each other from the respective clamping arms 40. A fastening space 43 is defined between a closed end 45 of the mounting member 14 and the fastening elements 41.

The mounting member 14 and the main part 12 have cooperating attaching formations to attach the mounting member 14 in the holding formation 36. The attaching formations are in the form of two pairs of snap fit formations 42 on the mounting member 14, and two inwardly extending projections 44 on the holding formation 36.

Each of the clamping arms 40 has two opposite side ends 46, and each snap fit formation 42 is provided on a respective one of the side ends 46. The inwardly extending projections 44 have opposite ends 48 to engage the snap fit formations 42.

The mounting member 14 and the holding formation 36 also include locating portions for locating the mounting member 14 in the holding formation 36. The locating portions comprise the inwardly extending projections 44 of the holding formation 36, and upper and lower projections 50 of the mounting member 14.

The inwardly extending projections 44 define upper and lower indented regions 52 to receive the upper and lower projections 50 of the mounting member 14.

The upper and lower indented regions 52 of the inwardly extending projections of the holding formation 36 cooperate with the upper and lower projections 50 of the mounting member 14 to locate the mounting member 14 in the holding formation 36.

Figures 4, 5:
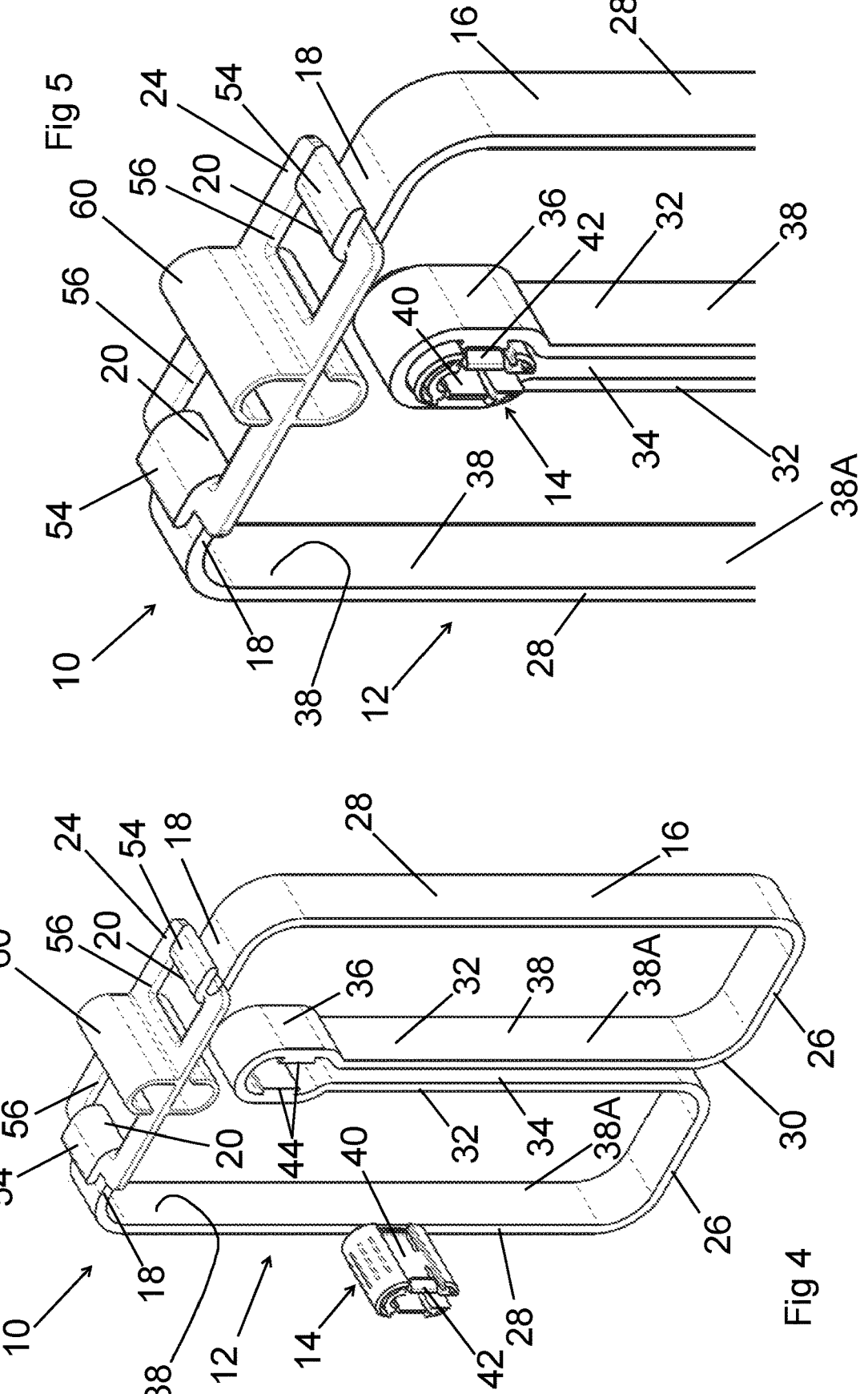
FIG. 4 shows the mounting member being received by a holding formation of a main part of the first embodiment of hanger.
FIG. 5 is a close up view showing the mounting member received by the holding formation.
Figure 6:
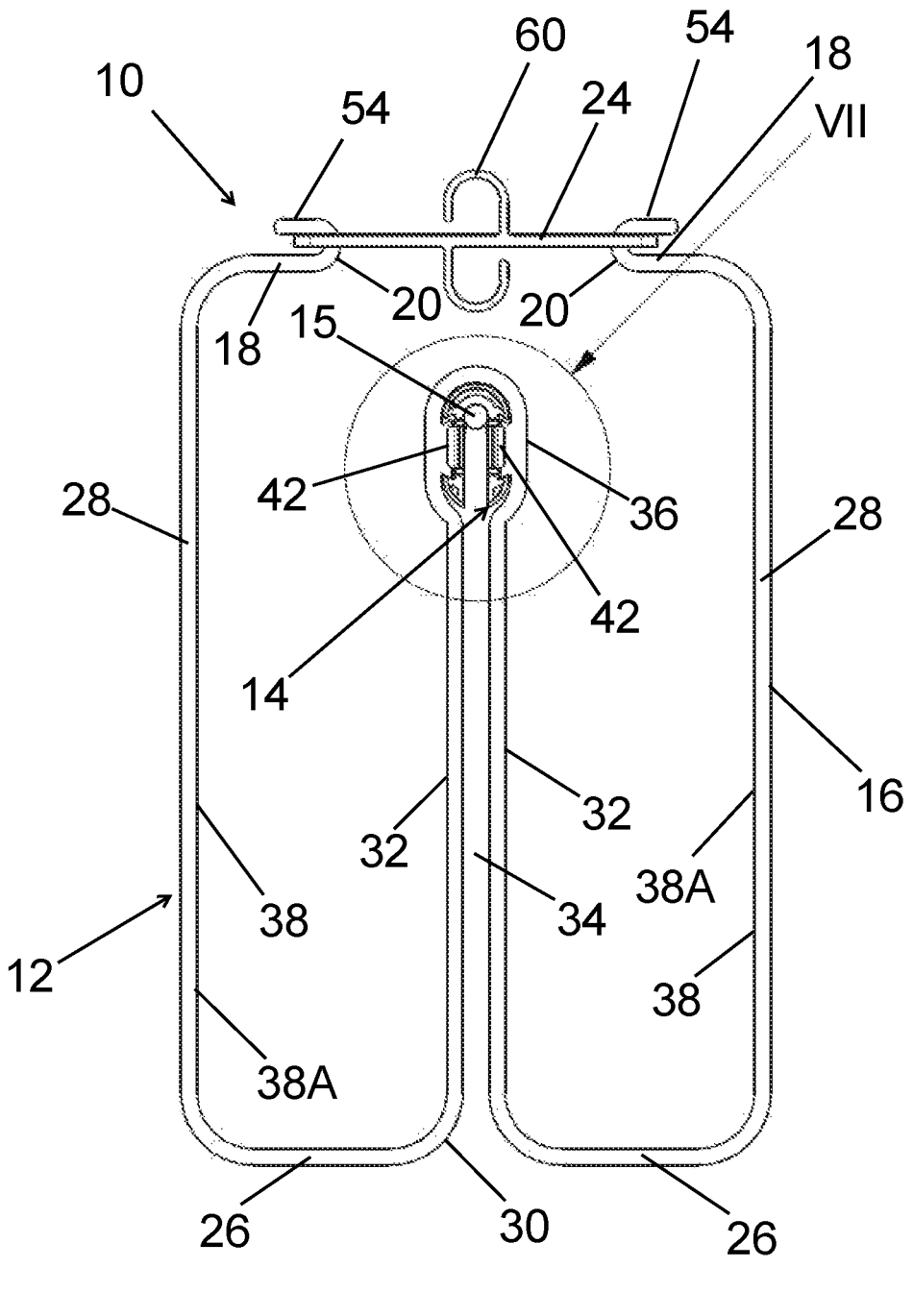
FIG. 6 is a front view of the first embodiment of hanger.

The mounting member 14 is first pushed into the holding formation 36, as shown in FIGS. 4 and 5. When the mounting member 14 is received in the holding formation 36, the snap fit formations 42 engage the ends of the inwardly extending projections of the holding formation 36.

In addition, when so received, the upper and lower projections 50 of the mounting member 14 are received within the upper and lower indented regions 52 to secure the mounting member 14 within the holding formation 36.

The elongate article 15 can then be introduced into the mounting member 14 via the access formation 34. The elongate article 15 is pushed over the projecting fastening elements 41 of the mounting member 14 into the fastening space 43. The elongate article 15 is held in the fastening space 43 by the projecting fastening elements 41, and clamped therein by the clamping arms 40.

The clamping of the elongate article 15 by the clamping arms 40 helps prevent the hanger 10 sliding along the elongate article 15, ensuring the hanger 10 remains in place on the elongate article 15. The mounting member 14 also acts as a bonding interface between the elongate article 15 and the main part 12.

FIG. 2 is an exploded view, showing the gap 22 that provides the entry region for the cables 11 to be received in the support portions 38. The closure member 24 is also shown in this drawing.

The main part 12 includes a fastening arrangement to fasten the closure member 24 to the main part 12. The closure member 24 is elongate, having opposite ends. The fastening arrangement comprises two sets of first and second cooperating fastening formations.

Each of the first fastening formations is the form of a hook formation 54 provided on each of the free ends 20 of the upper walls 18. Each of the second fastening formations comprises a hole 56 defined by the closure member 24, adjacent a respective one of the opposite ends of the closure member 24.

The hook formations 54 are received through the holes 56 to affix the closure member 24 to the main part 12. The main part 12 is resiliently deformable. The resilience of the main part 12 urges the hook formations 54 into tight engagement with the closure member 24 when the hook formations 54 are received through holes 56.

When the closure member 24 is removed from the main part 12, the length of the gap 22 is greater than the length of the closure member 24. This has the effect that, when the closure member 24 is fastened to the main part 12, the main part 12 is forcibly held in tight engagement with the closure member 24 closed, thereby maintaining the closure member 24 fastened to the main part, even under load.

The closure member 24 includes a guide formation 60 to guide further elongate items in the form of further cables 11A (represented schematically by broken lines in FIG. 1), for example data cables. The guide formation 60 is in the form of a pair of U shaped members arranged on opposite sides of the closure member 24.

The main part 12 can be manufactured by extrusion, or wire forming in a metal former. This provides a cost effective method of making the hanger 10. The mounting member 14 may be made of a polymeric material.

The clamping arms 40 clamp the elongate article 15 and help to secure the hanger 10 along with the fastening elements 41. The securing of the hanger 10 to the elongate article 15 reduces movement of the hanger 10 along the elongate article 15.

The closure member 24 has the effect of creating a force on the main part 12 which keeps the closure member 24 in a closed position. The closure member 24 can be opened from either side. The closure member 24 also has a guide formation 60 to hold data cables 11A.

Various modifications can be made without departing from the scope of the invention. For example, the main part 12 may define two gaps 22, namely a respective gap 22 for each support portion 38. The gaps 22 may be defined in the side edge regions of the main part 12. Each gap 22 may have a respective closure member 24, which may be pivotally mounted on the main part 12.

A second embodiment of the hanger, generally designated 110, is shown in FIGS. 12 to 20. The hanger 110 comprises a body 111, which comprises a main part 112 and a reinforcing member 114 for reinforcing the main part 112.

The reinforcing member 114 is in the form of an insertion member for insertion into the main part 112, whereby the reinforcing member 114 is received by the main part 112. The reinforcing member 114 may be formed of a metal material. The main part 112 comprises a frame.

The main part 112 comprises walls 116 and a receiving region in the form of a cavity 118 for receiving the reinforcing member 114. The cavity 118 has a substantially flat portion 120, and is surrounded by the walls 116. The reinforcing member 114 is substantially planar.

The reinforcing member 114 is received in the cavity 118, in engagement with the flat portion 120. The reinforcing member 114 is secured in the cavity 118 by snap fit formations 121 on the walls 116. The reinforcing member 114 and the flat portion 120 are offset from the central plane of the main part 112 in opposite directions, so the loads on the hanger 110 are borne evenly through the main part 112 and the reinforcing member 114.

The walls 116 comprise a pair of opposed upper walls 122 forming an upper edge region 123 of the main part 112. The main part 112 has a lower wall 124 forming a lower edge region 125.

The walls 116 also comprise a pair of opposite side walls 126 extending between the upper and lower walls 122, 124. The side walls 126 provide side edge regions 127 of the main part 112.

One of the side walls 126 defines a gap 128 (see FIG. 13) defined in the side edge region 127 of the main part 112. The reinforcing member 114 defines a corresponding gap 129 aligned with the gap 128.

The hanger 110 further includes a closure member 130, in the form of a gate member, extending across the gap 128. The closure member 130 is fastened to the body 111 at the main part 112 across the gap 128 and the corresponding gap 129. The closure member 130 is discussed in more detail below.

Figure 25:
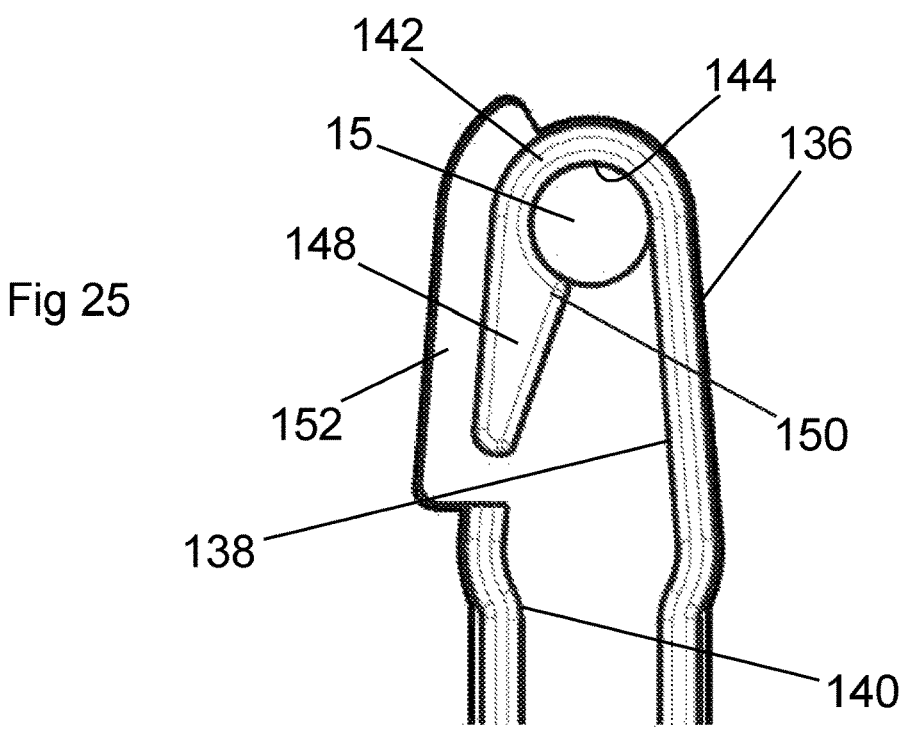
FIG. 25 is a close up front view of the region marked XXV in FIG. 21.
Figure 26:
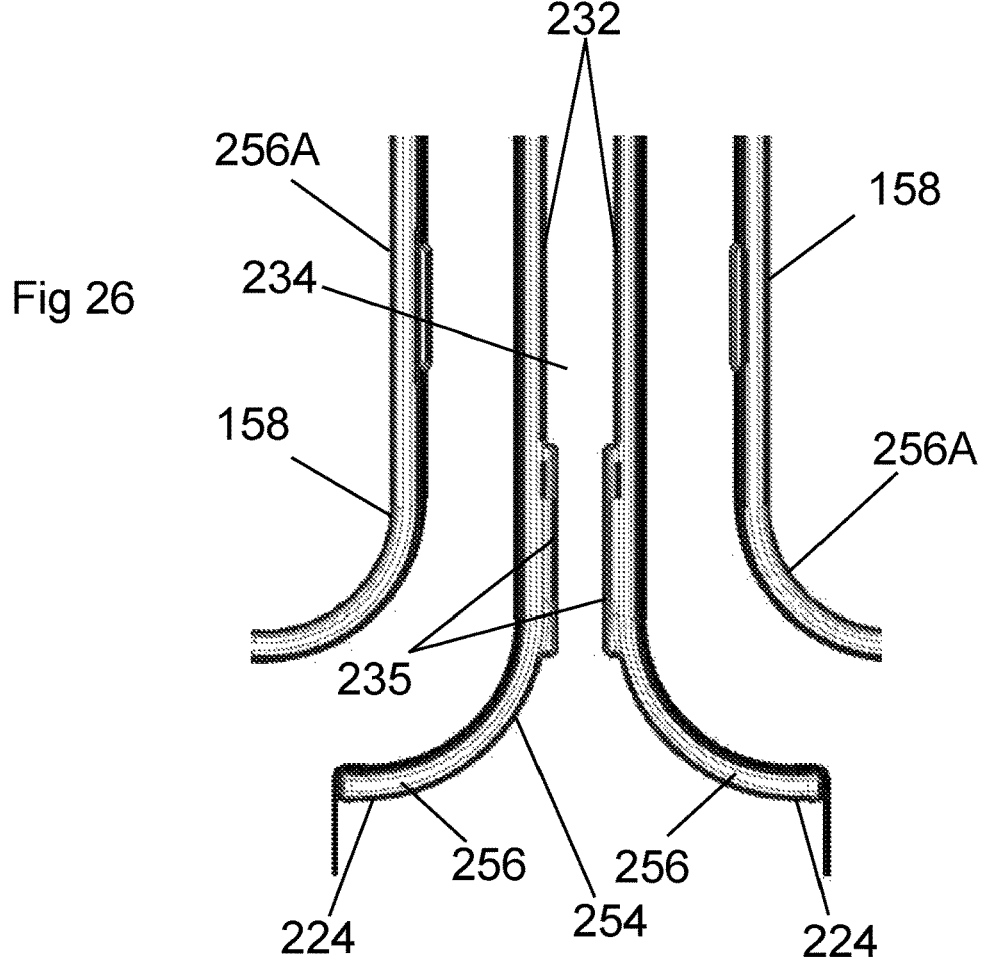
FIG. 26 is a close up front view of the region marked XXVI in FIG. 21.

The main part 112 has a holding formation 136 in which the elongate article 15 is held. The holding formation 136 includes a recess 138 defined by the main part 112. The recess 138 has an open end 140 for enabling the elongate article 15 to be received into the recess 138 (see FIGS. 16, 17 and 25).

The recess 138 further includes a locking end 142 defining a locking space 144 in which the elongate article 15 is locked. The holding formation 136 further includes a detent member 146 for locking the elongate article 15 in the locking space 144.

The detent member 146 is in the form of a resiliently deformable gripping member for gripping the elongate article 15. The detent member 146 comprises a locking portion 150. The locking portion 150 is in the form of a shoulder for engaging the elongate article 15, and locking the elongate article in the locking space 144.

Figure 14:
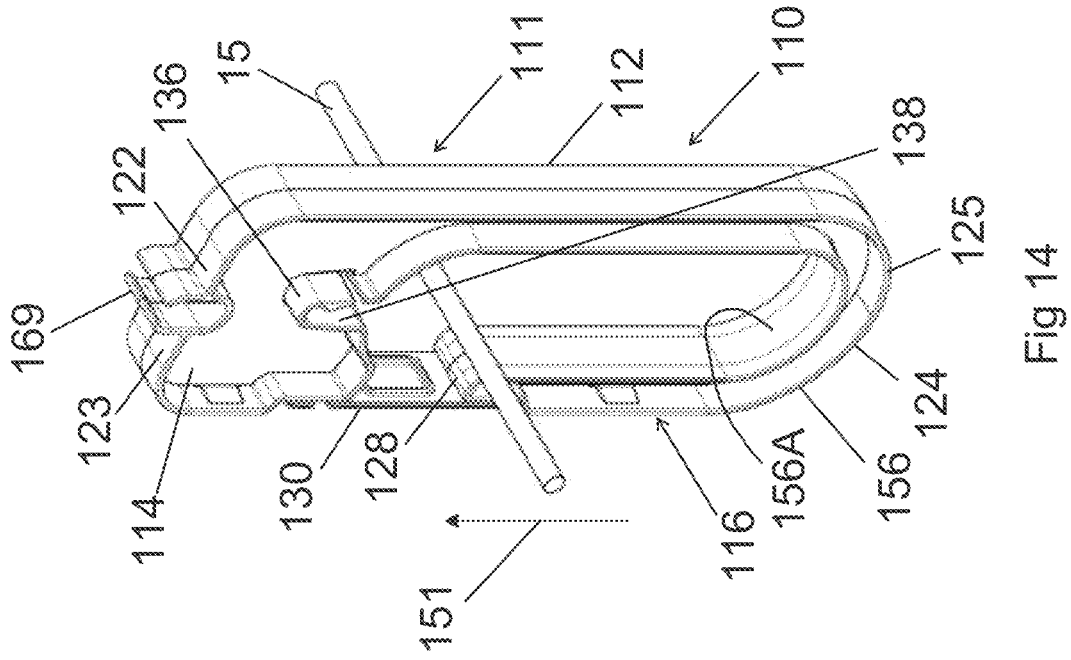
FIG. 14 is a perspective view of the hanger shown in FIG. 12 being mounted on an elongate article.

The detent member 146 is deformed by the elongate article 15 as the elongate article 15 moves past the locking portion 150, as indicated by the arrow 151 in FIG. 14, into the locking space 144.

Figure 15:
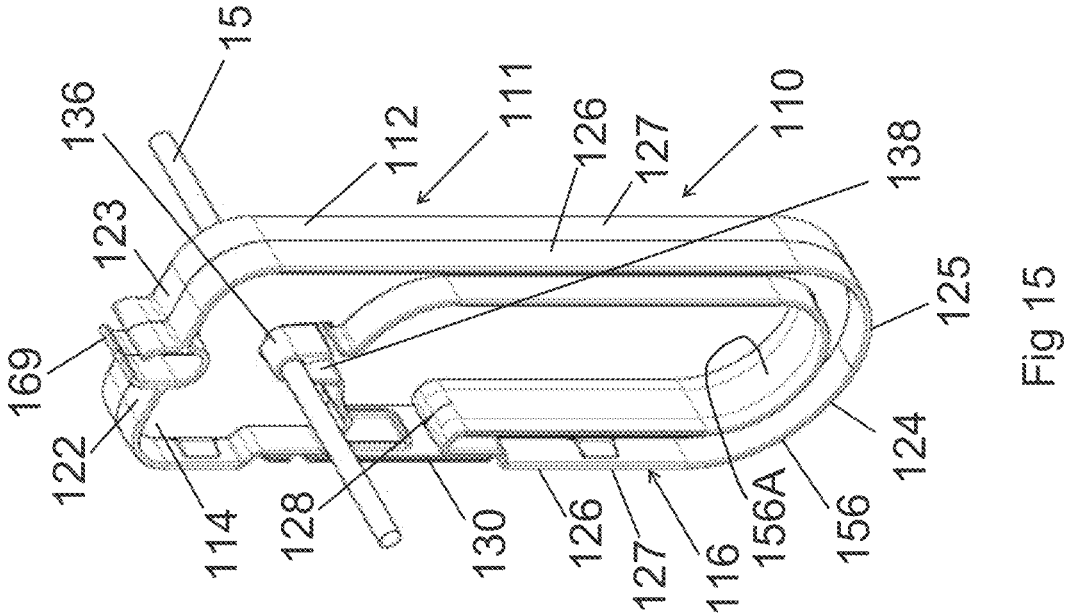
FIG. 15 is a perspective view of the hanger shown in FIG. 12 mounted on an elongate article.
Figure 17:
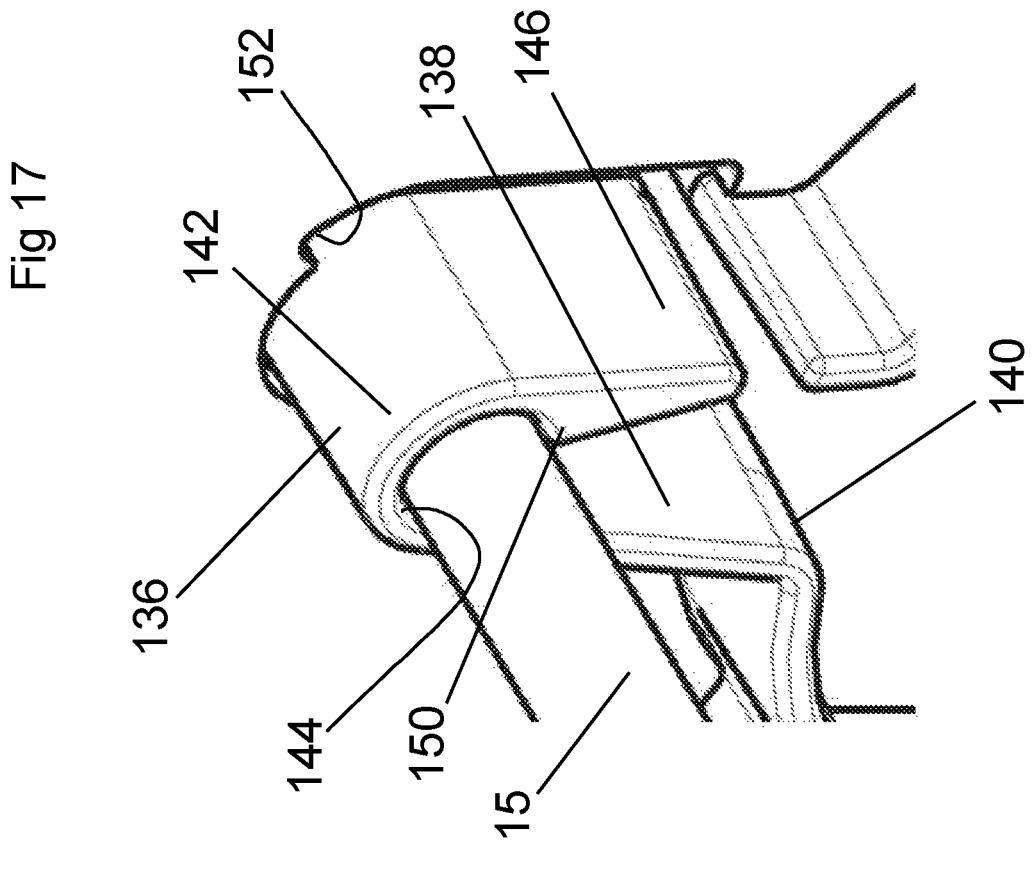
FIG. 17 is a close up perspective view of the region marked XVI in FIG. 12.
Figure 16:
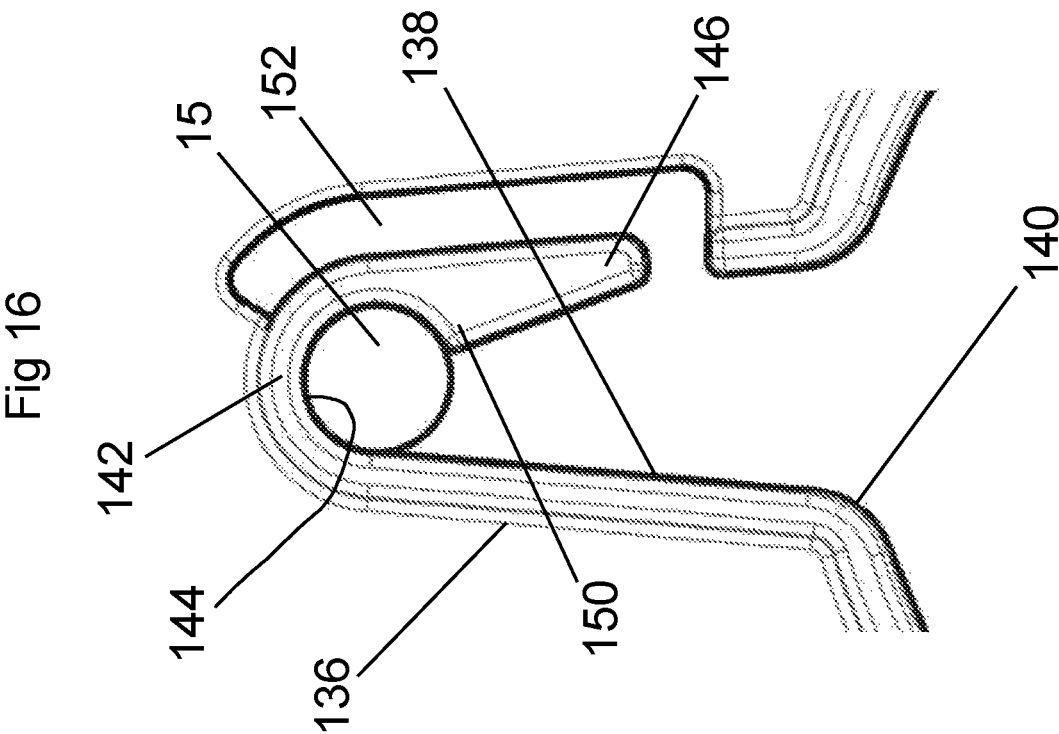
FIG. 16 is a close up front view of the region marked XVI in FIG. 12.

The holding formation 136 defines a receiving space 152 into which the detent member 146 is received when the resilient portion 148 is deformed by the elongate article 15, as shown in FIGS. 15, 16 and 17.

The reinforcing member 114 defines a corresponding holding space 154. The holding space 154 is aligned with the holding formation 136 when the reinforcing member 114 is received by the main part 112. The holding space 154 includes a corresponding receiving space 155 aligned with the receiving space 152 when the reinforcing member 114 is received by the main part 112. The reinforcing member 114 extends across the holding portion 136. Thus, the load on the elongate article 15 is borne by the reinforcing member 114.

The main part 112 has a support portion 156 defining a supporting space 156A. The gap 128 is provided to allow access for the cables 11 to the supporting space 156A. The reinforcing member 114 has a support element 153 defining a corresponding supporting space 157 aligned with the supporting space 156A. The reinforcing member 114 extends across the support portion 156 to reinforce the support portion 156.

FIGS. 14 and 15 show the elongate article 15 being received in the holding formation 136. FIG. 14 shows the elongate article 15 within the supporting space 156A, having been received therein through the gap 128 before the closure member 130 is affixed to the main part 112. FIG. 15 shows the elongate article 15 locked in in the holding formation 136.

Each of the walls 116 comprises inner and outer wall members 158, 159 surrounding the supporting space 156A. The inner and outer wall members 158, 159 comprise inner and outer upper wall members 160, 161 and inner and outer lower wall members 162, 163. The inner and outer wall members 158, 159 further include inner and outer side wall members 164, 165 extending between the inner and outer upper wall members 160, 161, and the inner and outer lower wall members 162, 163.

The support portion 156 receives the cables 11 so that the cables 11 are supported by the hanger 110. The lower walls 122 have a concave radius to prevent the cables 11 being pinched and damaged in corners.

The main part 112 and the closure member 130 include a fastening arrangement 132 to fasten the closure member 130 to the main part 112. The fastening arrangement 132 comprises first fastening formations in the form of upper and lower protrusions 166.

The fastening arrangement further includes second fastening formations in the form of slots 168 defined at each end of the closure member 130. Each protrusion 166 is provided on the side wall 126 adjacent a respective of opposite end of the gap 128.

Each of the slots 168 has an open end through which a respective one of the protrusions 166 is received to fasten the closure member 130 to the main part 112. The protrusions 166 and the slots 168 are shaped to provide a press fit formations 168A for affixing the protrusions 166 in the slots 168.

The main part 112 includes a seat 169 for receiving further cables, such as the further cables 11A shown in FIG. 1. The seat 169 is in the form of a substantially U shaped member into which the further cables 11A can be received via an opening 169A.

Figure 20:
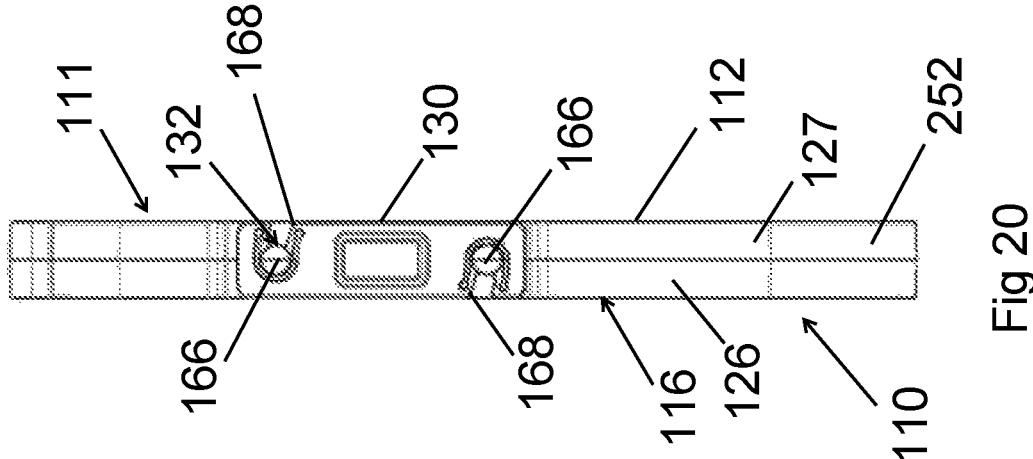
FIG. 20 is a side view of the hanger shown in FIG. 12, in which the closure member is in the closed position.
Figure 19:
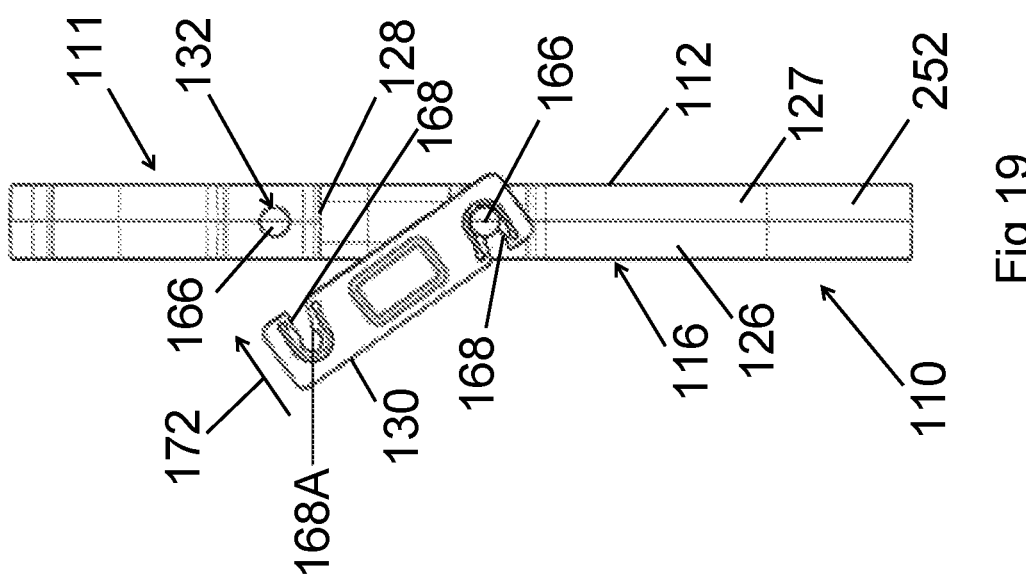
FIG. 19 is a side view of the hanger shown in FIG. 12, in which the closure member is in a position between the open and a closed position.
Figure 18:
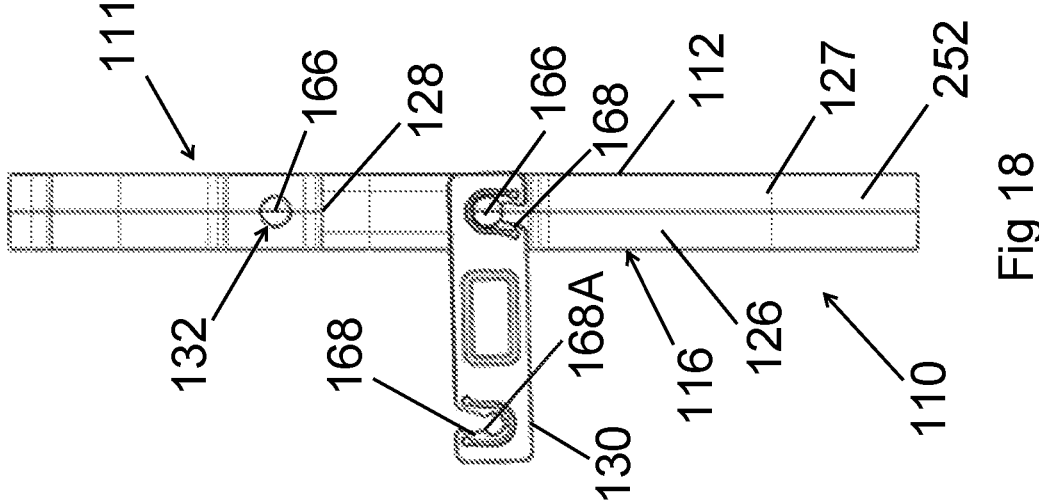
FIG. 18 is a side view of the hanger shown in FIG. 12, in which the closure member is in an open position.

FIGS. 18 to 20 show one way of fastening the closure member 130 to the main part 112. FIG. 18 shows the closure member 130 in an open position, in which one of the slots 168 has received the lower of the two protrusions 166.

FIG. 19 shows the closure member 130 being pivoted about the lower protrusion 166 to a closed position, as shown by the arrow 172. FIG. 20 shows the closure member 130 in the closed position fastened to the main part 112 by both of the protrusions 166 being received in the slots 168. The lower protrusion 166 has a larger diameter than the upper protrusion 166. Thus, the closure member 130 is a tighter fit on the lower protrusion 166 than the upper protrusion 166. This allows the closure member 130 to be easily released from the upper protrusion 166 and fastened thereon. The tighter fit of the lower protrusion 166 in the lower slot 168 has the effect that the closure member 130 is unlikely to be inadvertently dislodged from the lower protrusion 166.

FIGS. 21 to 33 show another version of the second embodiment of the hanger, generally designated 210. The hanger 210 is similar to the hanger 110, comprising many of the features of the hanger 110. The features of the hanger 210 that are the same as the features of the hanger 110 are designated with the same reference numerals as the corresponding features of the hanger 110.

The hanger 210 comprises a body 211 having a main part 212. The main part 212 comprises two support portions 256, each of which defines a supporting space 256A.

The body 211 further includes a reinforcing member 214. The reinforcing member 214 has two support elements 253. Each support element 253 defines a respective corresponding supporting space 257.

Each of the corresponding supporting spaces 257 is aligned with a respective one of the supporting spaces 256A. The reinforcing member 214 extends across both support portions 256 to provide reinforcement thereto.

The reinforcing member 214 is in the form of an insertion member for insertion into the main part 212, whereby the reinforcing member 214 is received by the main part 212. The reinforcing member 214 may be formed of a metal material.

The main part 212 comprises two upper walls 222, two lower walls 224, and two opposed central walls 232. The two lower walls 224 define an opening 254 therebetween.

Figure 21:
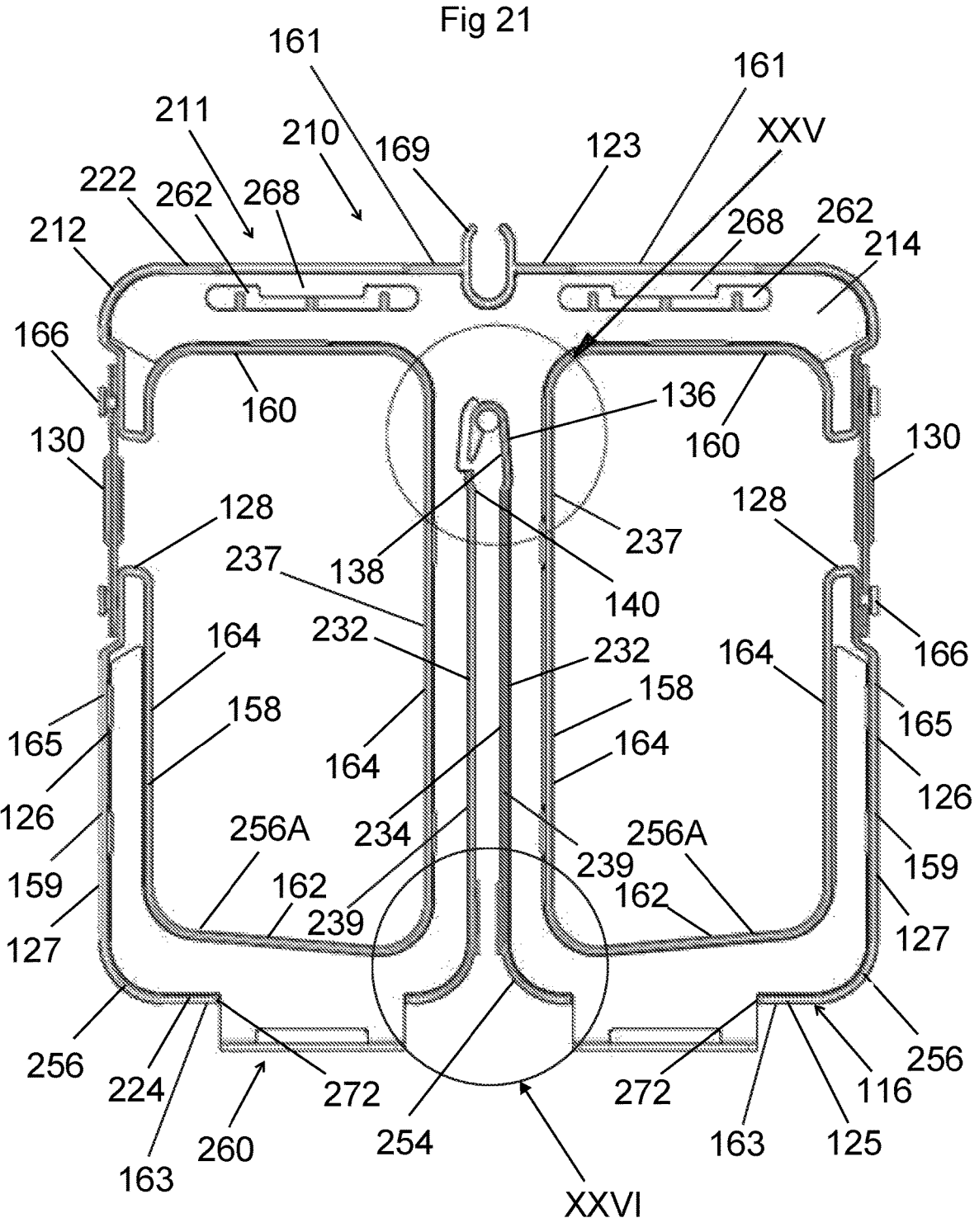
FIG. 21 is a front view of another version of the second embodiment of the hanger.

The central walls 232 extend upwardly from the lower walls 224 at the opening 254. The central walls 232 define an access formation 234 therebetween. As shown in FIG. 21, the access formation 234 is in the form of a passage extending from the opening 254 to the holding formation 136.

Each of the central walls 232 comprises first and second central wall members 237, 239.

The central walls 232 comprises abutment members 235 at the lower end of the access formation 234. If too many of the cables 11 are loaded into the supporting spaces 256A, the support portions 256 deform under their weight, causing the abutment members 235 to abut against each other. The abutting of the abutment members 235 prevents excessive deflection of the support portions 256.

Figures 23, 24:
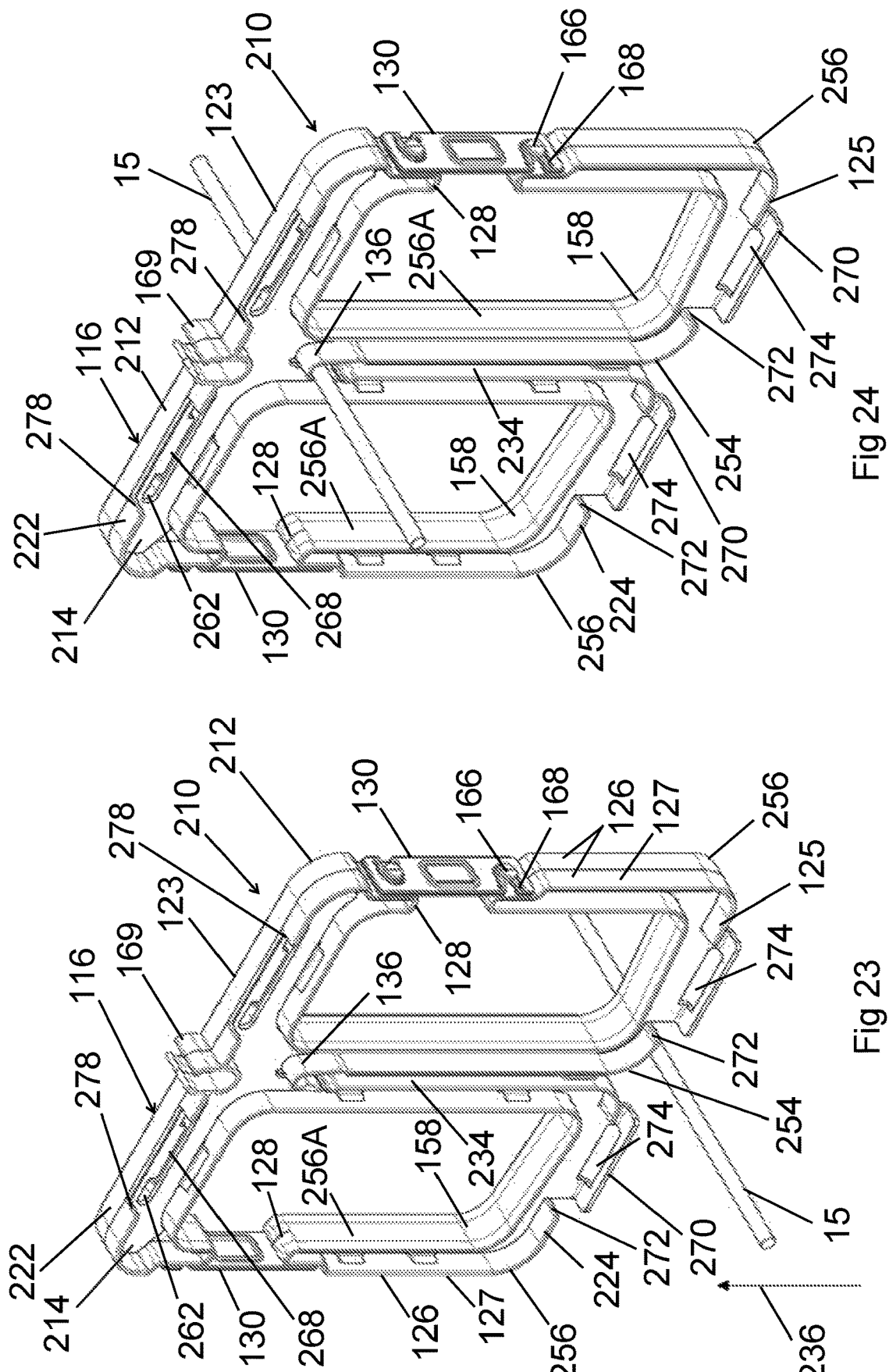
FIG. 23 is a perspective view of the hanger shown in FIG. 21 being mounted on an elongate article.
FIG. 24 is a perspective view of the hanger shown in FIG. 21 mounted on an elongate article.

Thus, as shown in FIGS. 23 and 24, the elongate article 15 is received through the opening 254, as indicated by the arrow 236 in FIG. 23. The elongate article 15 is moved along the access formation 234 to the holding formation 136, at which the elongate article 15 is locked in the holding formation 136 in the same way as described above in connection with FIGS. 15, 16 and 17. The reinforcing member 214 extends across the holding portion 136, so that the load on the elongate article 15 is borne by the reinforcing member 214.

Each of the support portions 256 defines a respective one of the gaps 128. A respective one of the closure members 130 is fastened across each of the gaps 128 by respective fastening arrangements 132.

Referring to FIGS. 27 to 33, the hanger 210 includes a connecting arrangement 260 for connecting an upper hanger 210 to a lower hanger 210'. The connecting arrangement 260 is provided at the upper and lower edge regions 123, 125 of the main part 212 and the reinforcing member 214.

The connecting arrangement 260 comprises two connecting apertures 262 defined at the upper edge region 123 of the hanger 210.

Figure 22:
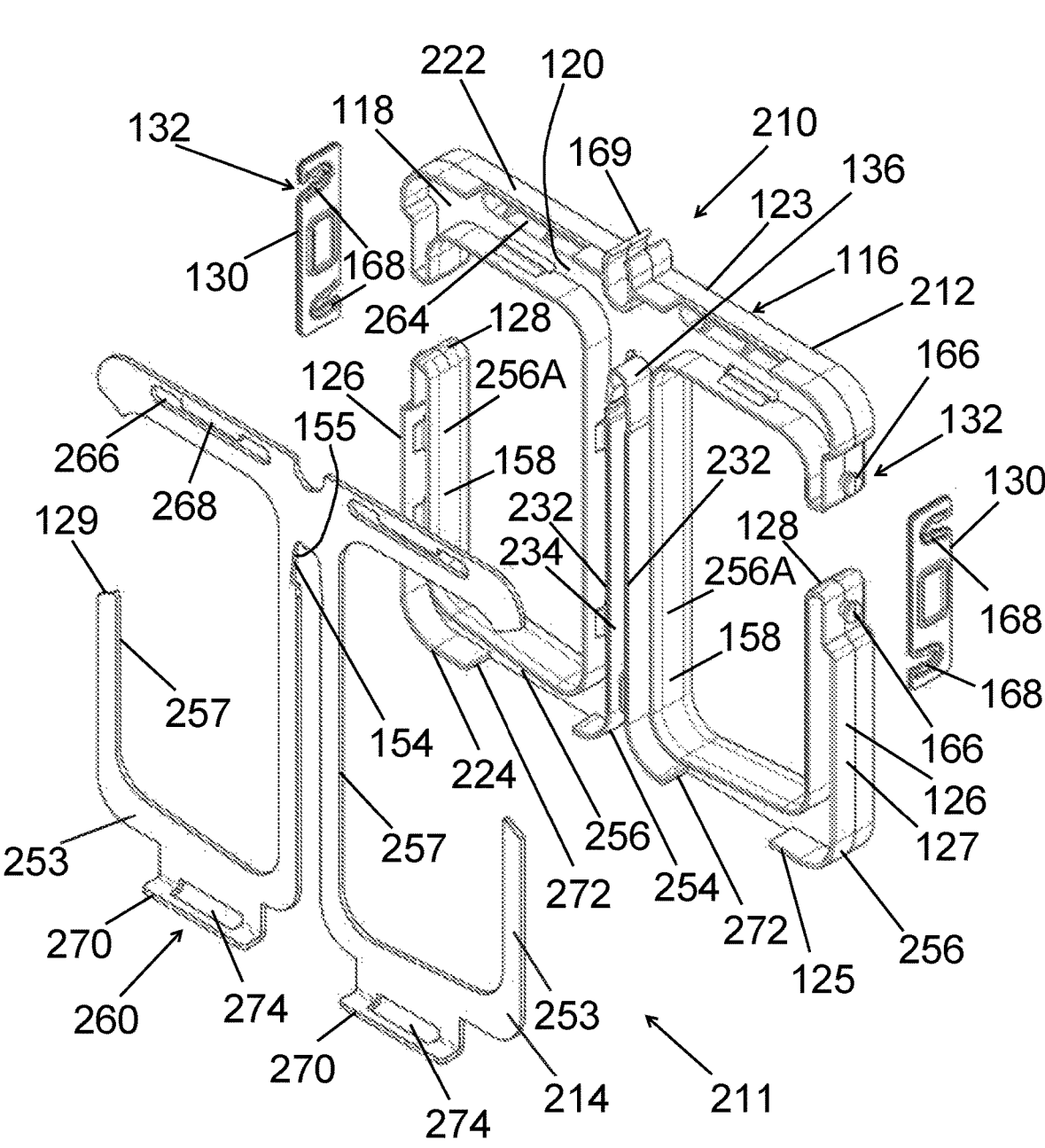
FIG. 22 is an exploded view of the hanger shown in FIG. 21.

Each of the main part 212 and the reinforcing member 214 define respective subsidiary apertures 264, 266 (see FIG. 22). Each of the subsidiary apertures 264 in the main part 212 is aligned with a respective one of the subsidiary apertures 266 of the reinforcing member 214 to form the connecting apertures 262.

The reinforcing member 214 further includes ridges 268 extending into the subsidiary apertures 266 of the reinforcing member 214. Thus, each ridge 268 extends into a respective one of the connecting apertures 262 of the hanger 210.

The connecting arrangement 260 further includes two connecting projections 270 at the lower edge region 125 of the reinforcing member 214. Each connecting projection 270 has a substantially L shaped side profile. The lower walls 224 define lower cut out regions 272 through which the connecting projections 270 extend.

The upper walls 222 define upper cut out regions 278. Each connecting projection 270 extends from the main part 212. The connecting projections 270 are received through the upper cut out regions 278 of the lower hanger 210', and through a respective one of the connecting apertures 262 of the lower hanger 210' to connect the upper hanger 210 to the lower hanger 210'.

Each connecting projection 270 defines a projection receiving slot 274 to receive the projection 268 of a further hanger. The projections 268 and the projection receiving slots 270 can be seen in FIGS. 31, 32 and 33.

Figure 33:
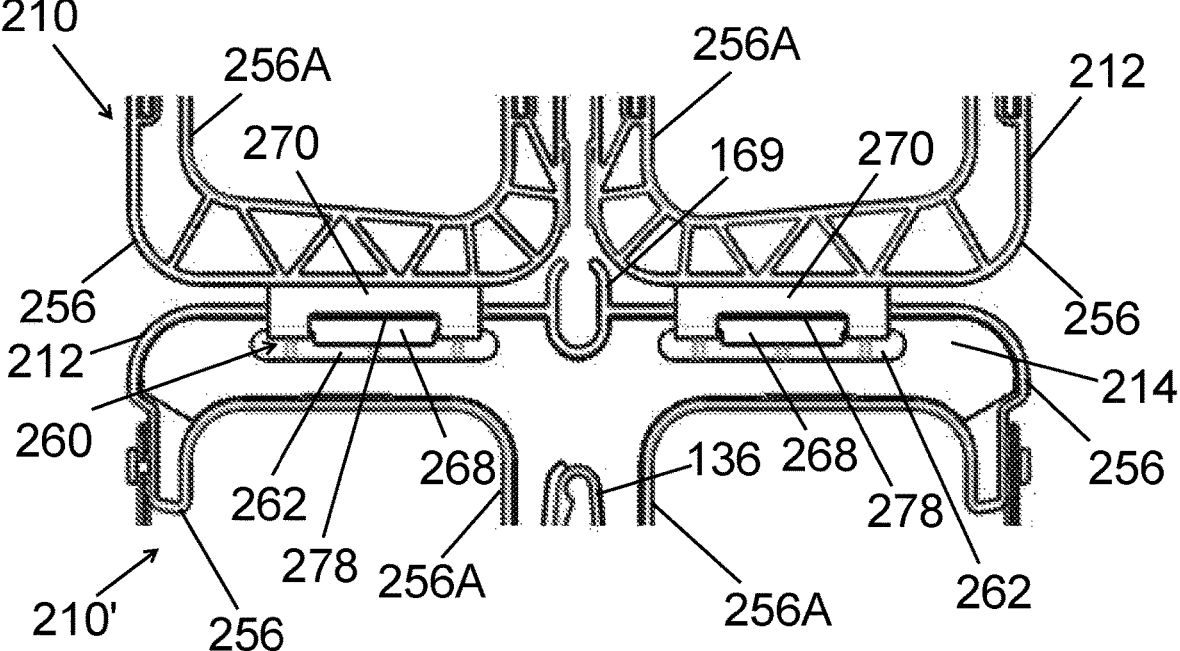
FIG. 33 is a close up front view of the region marked XXXIII in FIG. 27.

FIG. 33 shows the interconnection between the connecting projections 270 of an upper hanger 210, and the connecting apertures 262 of a lower hanger 210'. The projections 268 of the lower hanger 210' are received in the projection receiving holes 274 in the connecting projections 270 of the upper hanger 210.

The connecting apertures 262 are defined at the upper edge region 123 of the main part 212. The subsidiary apertures 266, 268 of the main part 212 and of the reinforcing member 214 are defined at the respective upper edge region 123 of each of the main part 212 and the reinforcing member 214. The connecting projections 262 are provided at the lower edge region 125 of the reinforcing member 214.

Figure 27:
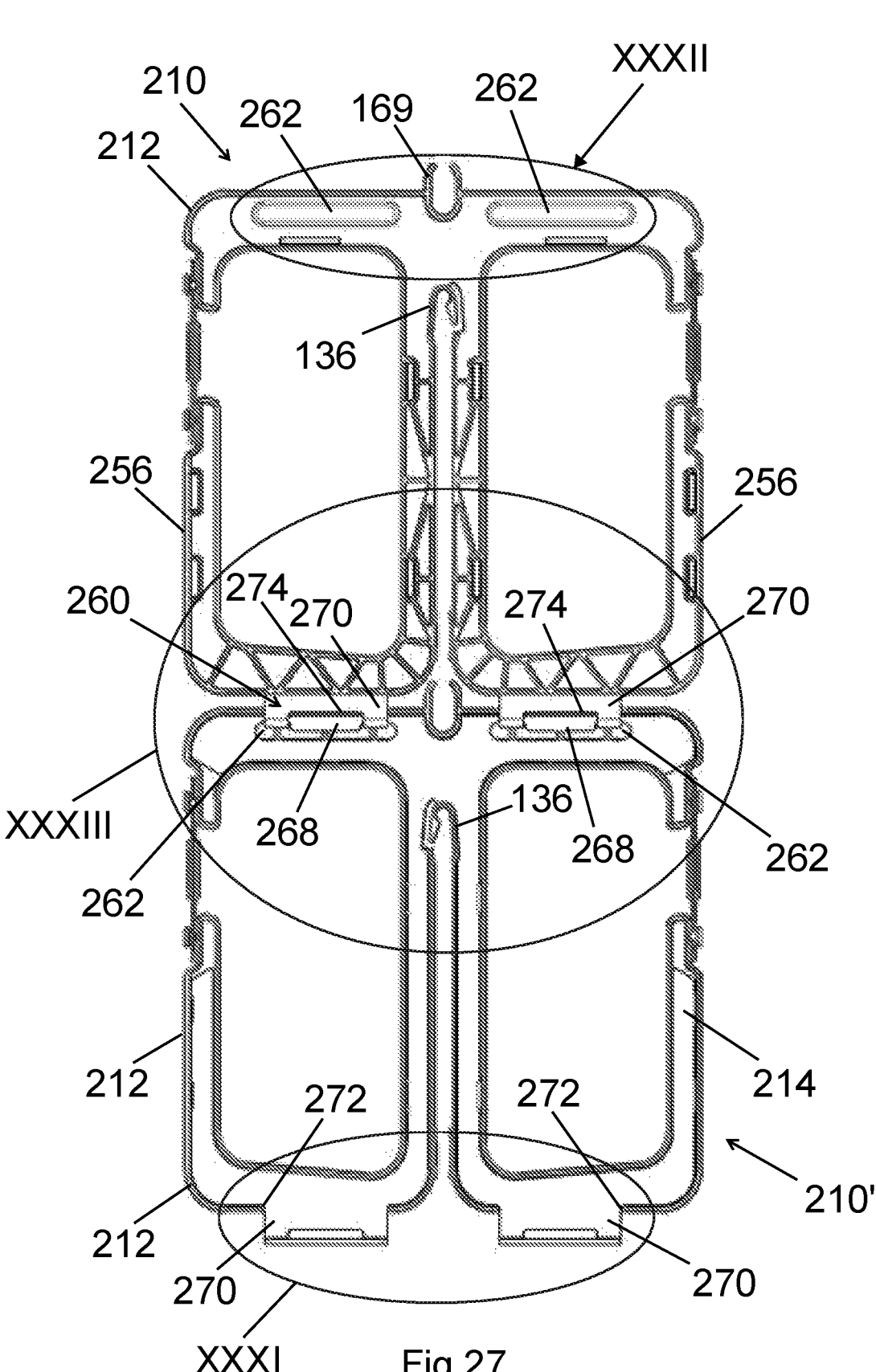
FIG. 27 is a front view of a hanger assembly comprising two of the hangers shown in FIG. 21, connected to each other.
Figure 28:
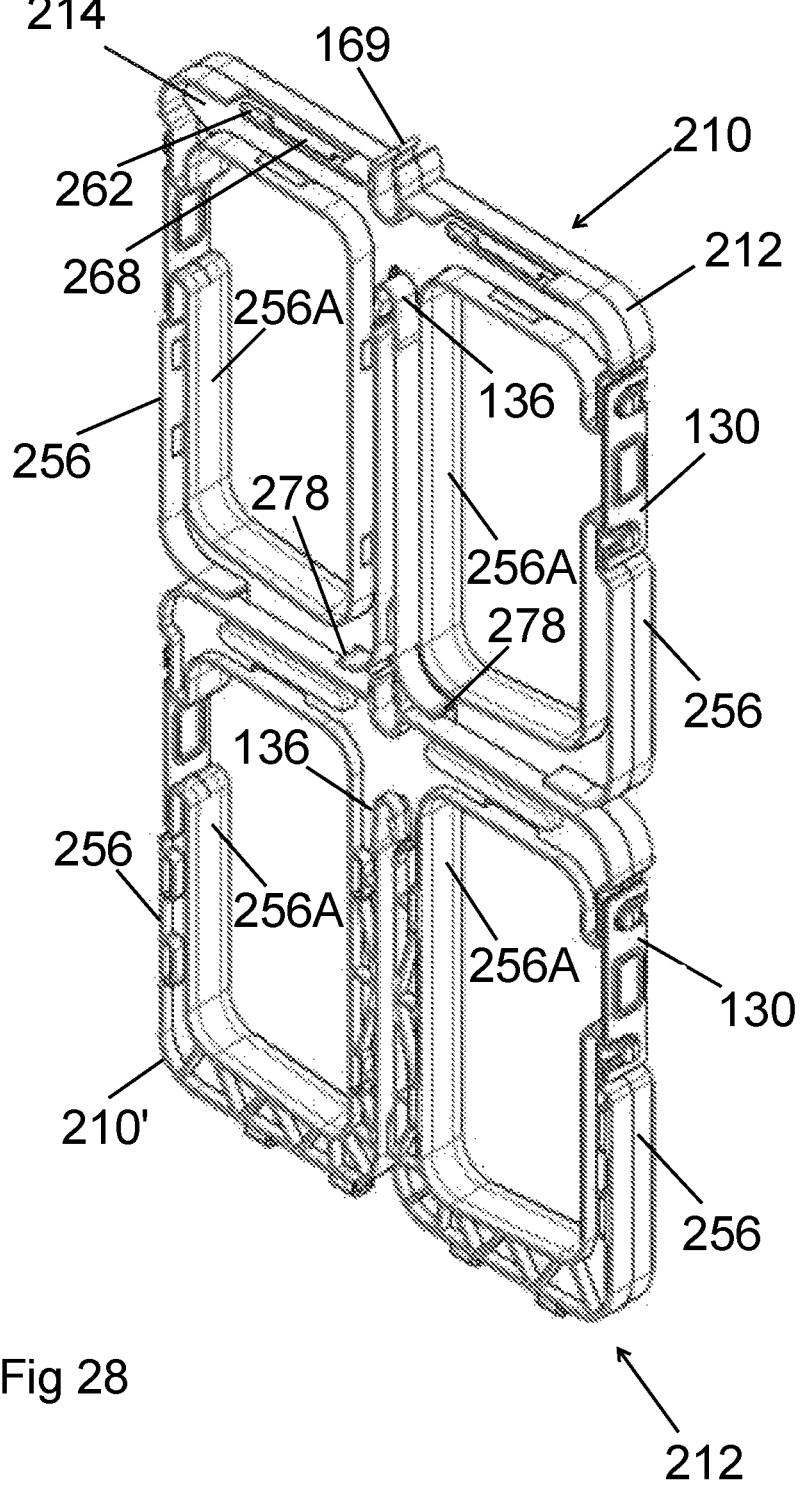
FIG. 28 is a perspective view of the hanger assembly shown in FIG. 21.
Figure 29:
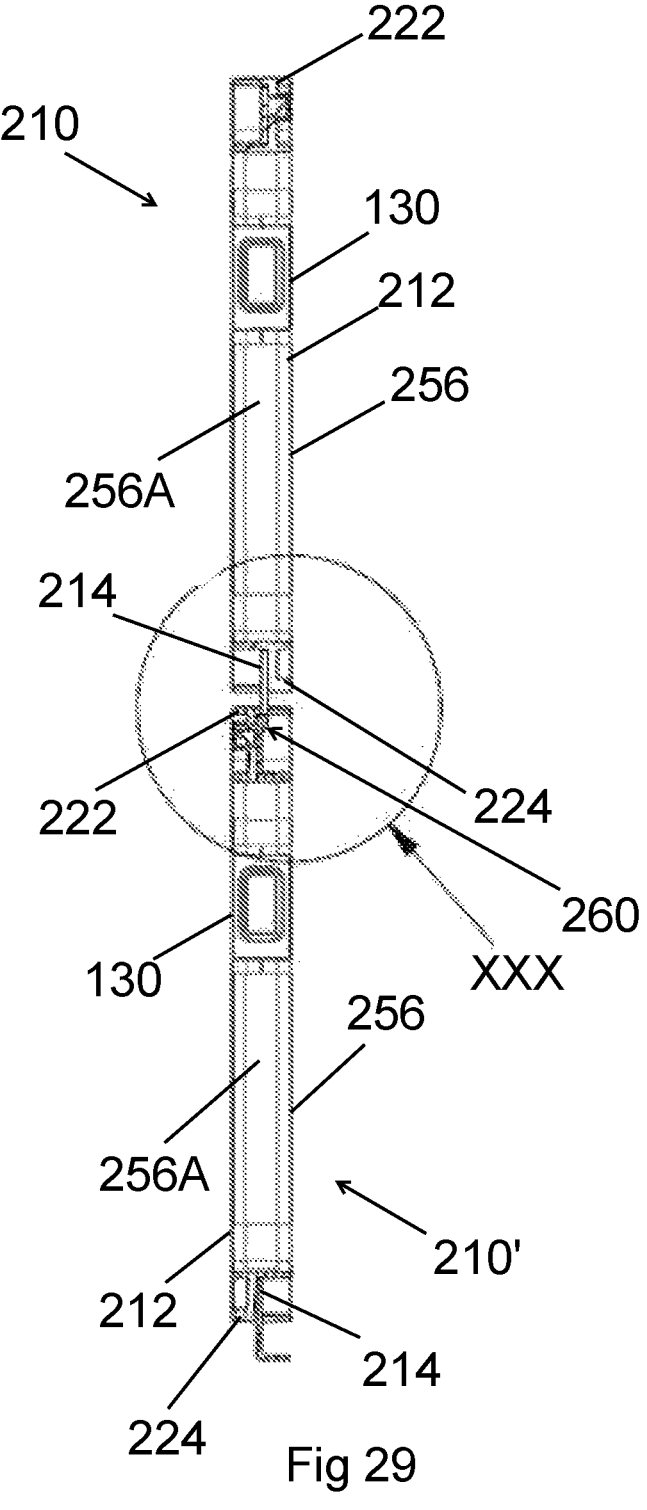
FIG. 29 is a side view of the hanger assembly shown in FIG. 21.
Figure 30:
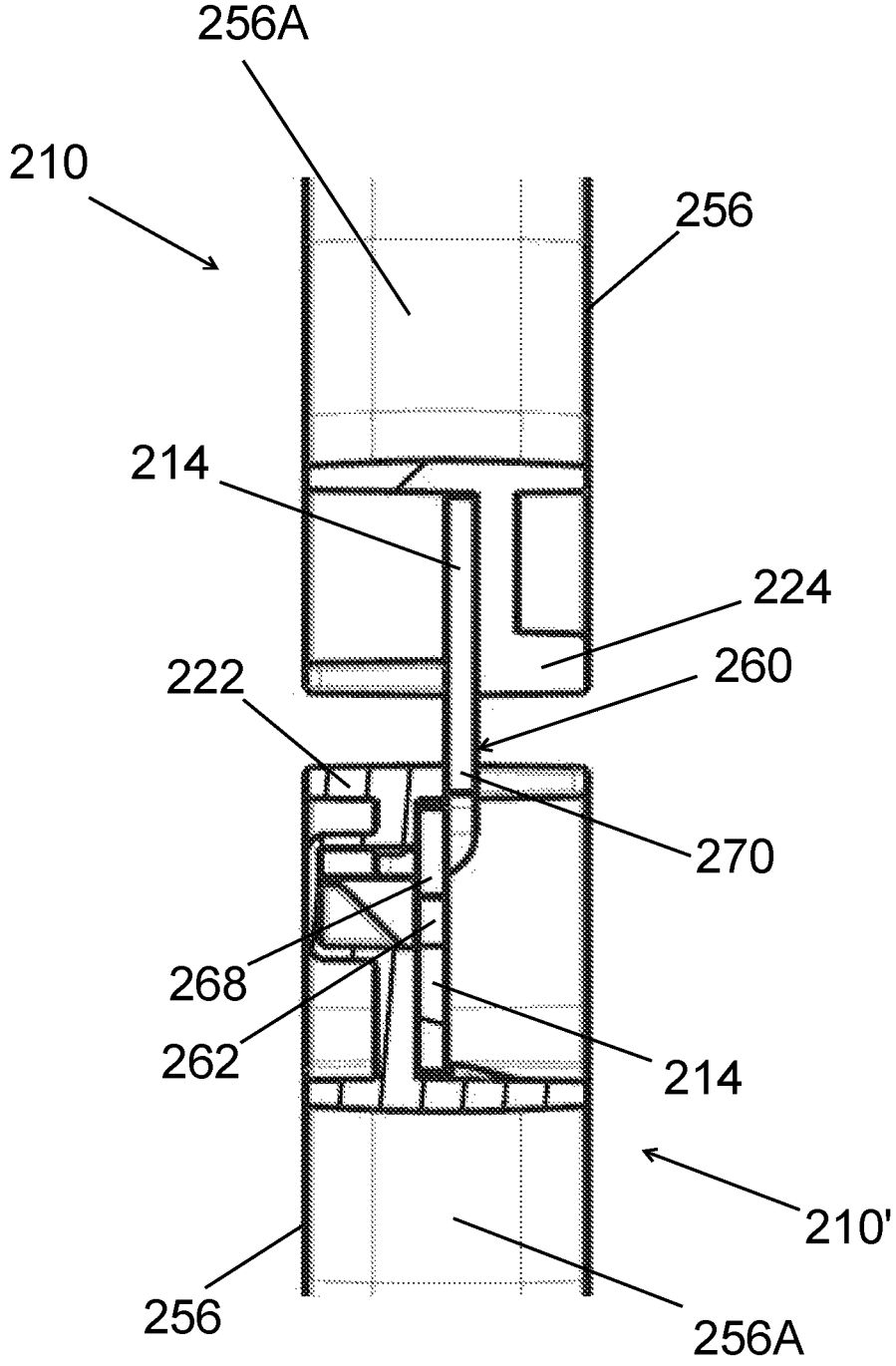
FIG. 30 is a close up side view of the region marked XXX in FIG. 29.
Figure 31:
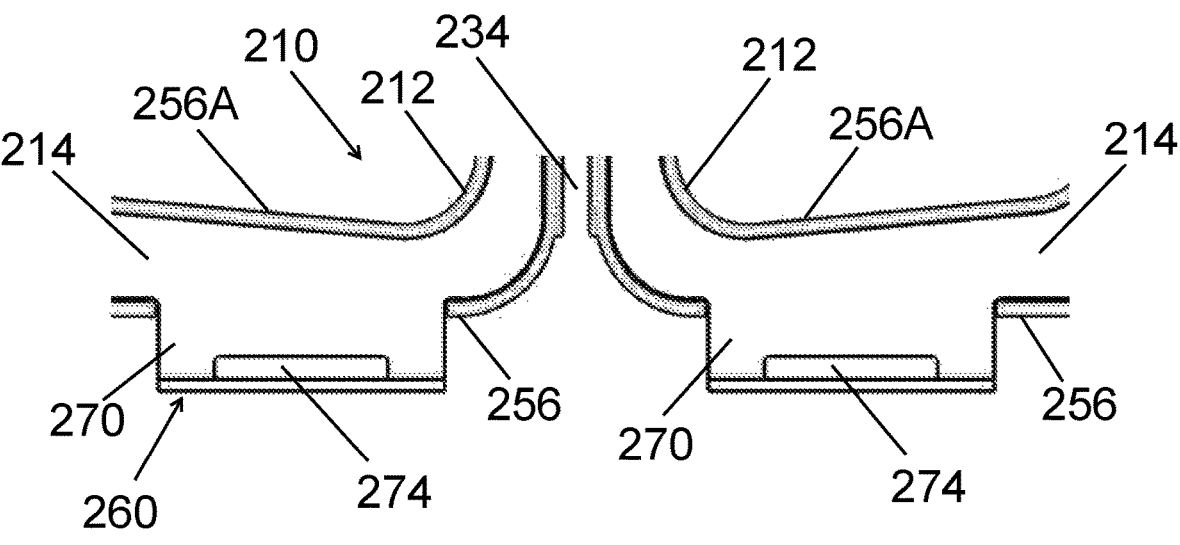
FIG. 31 is a close up front view of the region marked XXXI in FIG. 27.
Figure 32:
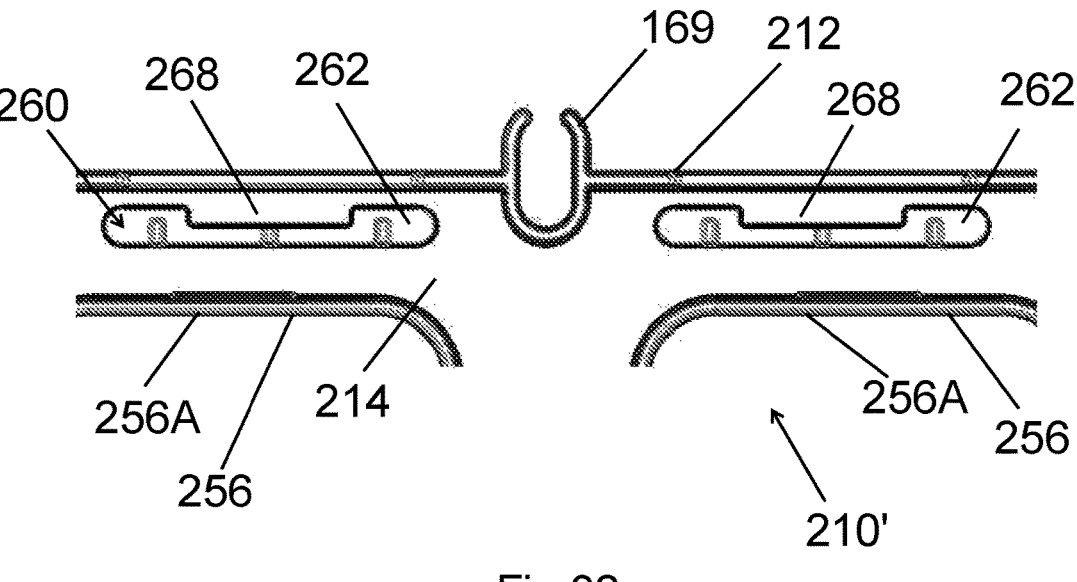
FIG. 32 is a close up front view of the region marked XXXII in FIG. 27.

Each connecting aperture 262 is defined adjacent a respective one of the supporting spaces 256A. FIGS. 27 and 28, show that the connecting apertures 262 are defined above the supporting spaces 256A.

Each connecting projection 270 is provided adjacent a respective one of the supporting spaces 256A. FIGS. 27 and 28 show that the connecting projections 270 are provided below the supporting spaces 256A.

The connecting projections 270 are part of the reinforcing member 214 and, thereby, are formed of metal. As a result the weight of the lower hanger 210' and the cables 11 supported by the lower hanger 210' are borne by the reinforcing member 214 of the upper hanger 210.

In a further modification, the hanger 110 shown in FIGS. 12 to 26 may be provided with a connecting arrangement similar to the connecting arrangement described above. In this modification, a single connecting aperture 262 may be provided above the supporting space 156A, and a single connecting projection 270 may be provided below the supporting space 156A.

There is thus described a hanger 10 for supporting cables 11 from an elongate article 15 in the form of a messenger wire of a catenary system. The hanger 10 can carry cables 11 such as electric cables, and facilitates the mounting of the cables 11 in the hanger 10.

The hangers 10, 110, 210 can be more quickly installed than prior art cable holders, allowing a time saving of about 40%. This reduces the length of time the installers need to be on site, and thereby, reduces cost. The main parts 12, 112, 212 of the hangers 10, 110, 210 have a thickness of about 20 mm, which means that it is more stable than prior art systems, which tend to be 4.6 mm wire forms.

The detent member 146 cooperates with the elongate article 15 to grip the elongate article 15. The locking portion 150 helps to secure the elongate article 15 to the hanger 10, 110, 210, thereby restricting or eliminating movement of the hanger 10, 110, 210 along the wire.

The reinforcing member 114, 214 provides strength and longevity without adding too much weight. The polymeric main part 112, 212 adds mechanical and electrical cable protection. The reinforcing member 114, 214 provides support to the polymeric main part 112, 212, thereby preventing creep of the main part 112, 212.

The closure members 24, 130 are fastened onto the main part 112, 212 of the hanger 110, 210 by press fittings. The closure members can be moved out of the way for installation of the hanger 10, 110. The closure members 24, 130 are replaceable in case of loss or damage.

The invention claimed is:

1. A hanger comprising:

a main part having a holder for holding an elongate article in a position in which the elongate article extends through the holder; and the main part having a support for supporting an elongate item;

wherein the main part defines a gap to allow the elongate item to be received in the support, and the hanger further including a closure to close the gap;

a reinforcement for reinforcing the main part, the reinforcement being received by the main part to secure the reinforcement to the main part, the reinforcement defining a holding space aligned with the holder when the reinforcement is received by the main part.

2. A hanger according to claim 1, wherein the reinforcement has a support element aligned with the support when the reinforcement is received by the main part.

3. A hanger according to claim 1, wherein the reinforcement is substantially planar, and the main part has a receiving region for receiving the reinforcement.

4. A hanger according to claim 3, wherein the receiving region comprises a substantially flat portion of the main part.

5. A hanger according to claim 1, wherein the holder defines a recess having an open end for receiving the elongate article into the recess, and the holder further includes a detent member within the recess for securing the elongate article in the holder.

6. A hanger according to claim 5, wherein the recess has a securing end defining a locking space, the detent member being arranged to lock the elongate article in the locking space.

7. A hanger according to claim 5, wherein the detent member comprises a resilient portion and a locking portion on the resilient portion, the resilient portion being deformable by the elongate article, and the locking portion being arranged for locking the elongate article in the holder.

8. A hanger according to claim 7, wherein the locking portion comprises a shoulder for engaging the elongate article to lock the elongate article to the holder.

9. A hanger according to claim 1, wherein the gap provides an access formation to allow access for the elongate article to the holder.

10. A hanger according to claim 1, wherein the main part has an upper edge region, the hanger comprising upper walls forming said upper edge region of the main part; and wherein the main part has a lower edge region, the hanger comprising lower walls forming the lower edge region.

11. A hanger according to claim 10, wherein the main part of the hanger defines an access formation to allow access for the elongate article to the holder, and wherein the lower edge region of said main part defines an opening for the access formation, the opening being defined between the lower walls.

12. A hanger according to claim 11, comprising a pair of central walls extending from the lower walls at the opening, the access formation being defined between the central walls, the central walls extending towards the upper walls; and the hanger comprises two of the supports, the supports being arranged on opposite sides of the central walls.

13. A hanger according to claim 12, wherein the access formation is defined between the central walls.

14. A hanger according to claim 1, wherein the main part of the hanger defines an access formation to allow access for the elongate article to the holder, the access formation extending from the holder of said hanger to an edge of the main part.

15. A hanger according to claim 1, further including a securing arrangement to secure the closure to the main part, the securing arrangement comprising a protrusion on the main part, and a hole defined by the closure.

16. A hanger comprising:

a main part having a holder for holding an elongate article in a position in which the elongate article extends through the holder; and the main part having a support for supporting an elongate item;

wherein the main part defines a gap to allow the elongate item to be received in the support, and the hanger further including a closure to close the gap;

a reinforcement for reinforcing the main part, the reinforcement being received by the main part, wherein the hanger includes a connector for connecting the hanger to a further hanger, the connector being provided at upper and lower edge regions of the main part and the reinforcement.

17. A hanger according to claim 16, wherein the connector comprises a connecting aperture defined at one of the upper and lower edge regions of the main part, and each of the main part and the reinforcement define a respective subsidiary aperture aligned with each other to form the connecting aperture.

18. A hanger according to claim 17, wherein the connector comprises a connecting projection at the other of the upper and lower edge regions of the reinforcement, the connecting projection being receivable in the connecting aperture of a further hanger to connect the hanger to the further hanger.

* * * * *